US012799904B2

(12) United States Patent
Ito et al.

(10) Patent No.: US 12,799,904 B2
(45) Date of Patent: Nov. 17, 2026

(54) POWERTRAIN CONTROL DEVICE

(71) Applicant: Mazda Motor Corporation, Aki-gun (JP)

(72) Inventors: Tatsuhiro Ito, Aki-gun (JP); Yugou Sunagare, Aki-gun (JP); Shunichiro Hayashi, Aki-gun (JP); Kenichiro Hashimoto, Aki-gun (JP); Atsushi Ohshita, Aki-gun (JP); Yuto Amami, Aki-gun (JP); Naoto Kawahara, Aki-gun (JP); Kiminori Higo, Aki-gun (JP)

(73) Assignee: Mazda Motor Corporation, Aki-gun (JP)

( * ) Notice: Subject to any disclaimer, the term of this patent is extended or adjusted under 35 U.S.C. 154(b) by 0 days.

(21) Appl. No.: 19/221,944

(22) Filed: May 29, 2025

(65) Prior Publication Data

US 2025/0369404 A1 Dec. 4, 2025

(30) Foreign Application Priority Data

Jun. 3, 2024 (JP) ................................ 2024-089898
Jan. 28, 2025 (JP) ................................ 2025-012013

(51) Int. Cl.
*F02D 41/02* (2006.01)
*F02D 41/14* (2006.01)

(52) U.S. Cl.
CPC ....... *F02D 41/023* (2013.01); *F02D 41/1498* (2013.01); *F02D 2041/0265* (2013.01);
(Continued)

(58) Field of Classification Search
CPC ................ B60W 10/06; B60W 10/11; B60W 2510/0628; B60W 2510/0638;
(Continued)

(56) References Cited

U.S. PATENT DOCUMENTS

2013/0253747 A1 9/2013 Amano

FOREIGN PATENT DOCUMENTS

JP H08158896 A 6/1996
JP 4196524 B2 * 12/2008

OTHER PUBLICATIONS

English Translation JP4196524 (Year: 2008).*
European Patent Office, Extended European Search Report Issued in Application No. 25175587.2, Oct. 10, 2025, 9 pages.

* cited by examiner

*Primary Examiner* — Anthony Ayala Delgado
(74) *Attorney, Agent, or Firm* — Alleman Hall LLP

(57) ABSTRACT

Provided is a powertrain control device for a vehicle including an exhaust gas purification apparatus and an automatic transmission, the vehicle traveling by controlling an engine and the automatic transmission. The powertrain control device includes an engine control module (ECM) and a transmission control module (TCM). The ECM performs entire-range stoichiometric air-fuel ratio operation control, and also performs intake air charge amount limit control when an intake air charge amount reaches an upper limit value that is set to prevent a temperature of a three-way catalyst from exceeding an allowable temperature. The TCM performs automatic shift control, and performs forced upshift control of forcibly shifting up the automatic transmission when an engine revolution speed reaches a revolution limit. When the ECM limits the intake air charge amount, the TCM performs revolution limit change control of lowering the revolution limit.

20 Claims, 17 Drawing Sheets

(52) U.S. Cl.
CPC .................. *F02D 2200/021* (2013.01); *F02D 2200/0414* (2013.01); *F02D 2200/0804* (2013.01); *F02D 2200/101* (2013.01)

(58) Field of Classification Search
CPC ... B60W 2510/0676; B60W 2510/068; B60W 2510/1005; B60W 2710/0633; B60W 2710/0644; B60W 2710/1005; B60W 30/1882; B60W 30/1884; F02D 2041/0265; F02D 2200/021; F02D 2200/0414; F02D 2200/0804; F02D 2200/101; F02D 37/02; F02D 41/0215; F02D 41/023; F02D 41/0235; F02D 41/1498; F16H 2300/00; F16H 59/74; F16H 59/78
See application file for complete search history.

CONVENTIONAL TECHNOLOGY

DISCLOSED TECHNOLOGY

FIG. 6

REVOLUTION LIMIT TABLE

| GEAR STAGE | FIRST GEAR STAGE | SECOND GEAR STAGE | THIRD GEAR STAGE | FOURTH GEAR STAGE | FIFTH GEAR STAGE | SIXTH GEAR STAGE |
|---|---|---|---|---|---|---|
| NORMAL REVOLUTION LIMIT RL-nor | NE0 | | | | | |
| TEMPORARY REVOLUTION LIMIT RL-temp | NE2 | | | NE3 | | |

* NE0 >> NE2 > NE3 (rpm)

FIG. 14

REVOLUTION LIMIT TABLE

| GEAR STAGE | FIRST GEAR STAGE | SECOND GEAR STAGE | THIRD GEAR STAGE | FOURTH GEAR STAGE | FIFTH GEAR STAGE | SIXTH GEAR STAGE |
|---|---|---|---|---|---|---|
| NORMAL REVOLUTION LIMIT RL-nor | NE0 | | | | | |
| TEMPORARY FIRST REVOLUTION LIMIT RL-temp1 | NE11 | NE12 | NE13 | NE14 | NE15 | NE16 |
| TEMPORARY SECOND REVOLUTION LIMIT RL-temp2 | – | – | – (NE23) | NE24 | – | – |

NE0 >> NE1* NE14 > NE24 (rpm)

POWERTRAIN CONTROL DEVICE

TECHNICAL FIELD

The disclosed technology relates to a powertrain control device for a vehicle having an engine mounted therein, the engine operating at a stoichiometric air-fuel ratio over the entire operation range.

BACKGROUND ART

In recent years, regulations on emissions (e.g., exhaust emissions) have been tightened from the viewpoint of protecting the environment. Vehicles that travel by driving of engines (so-called engine vehicles) are a main target of emissions regulations because such vehicles emit exhaust gas.

Thus, for engine vehicles, attempts have been already made to enhance performance with emissions. In the case of an engine vehicle that uses gasoline as fuel, a three-way catalyst can effectively remove the main exhaust emissions of the vehicle: hydrocarbon, carbon monoxide, and nitrogen oxide.

Accordingly, the three-way catalyst an effective means for engine vehicles of this kind. Currently, exhaust gas purification apparatuses that use a three-way catalyst are widely used.

An exhaust gas purification rate of the three-way catalyst is affected by air-fuel ratio (A/F). That is, to obtain a high purification rate, it is necessary to stabilize an air-fuel ratio at a stoichiometric air-fuel ratio (14.7) or within a narrow range around the stoichiometric air-fuel ratio (a so-called window). For this reason, to achieve advanced emission performance such as zero emission in an engine vehicle, it is required to perform operation within the window over the entire operation range of the engine (referred to as "entire-range stoichiometric air-fuel ratio operation" in the present disclosure).

In contrast, when a three-way catalyst remains at an excessively high temperature, the three-way catalyst is thermally deteriorated and hence durability of the three-way catalyst is reduced. Accordingly, in an exhaust gas purification apparatus that uses the three-way catalyst, it is necessary to perform temperature control in such a way as to prevent the temperature of the three-way catalyst from exceeding an allowable temperature for the three-way catalyst. However, when the entire-range stoichiometric air-fuel ratio operation is performed, combustion takes place efficiently, increasing the amount of heat in the exhaust gas. Therefore, in an operation range in which the amount of heat in the exhaust gas is at the maximum, that is, in a range with a high engine revolution speed and a high load, there is a possibility of the temperature of the three-way catalyst exceeding the allowable temperature.

In general, in an operation range in which the temperature of the three-way catalyst is likely to exceed the allowable temperature, a technique of increasing fuel (a so-called enrichment control) is used. With this technique, it is possible to reduce the amount of heat in the exhaust gas by making use of the heat of vaporization of fuel and hence it is possible to suppress thermal deterioration of the three-way catalyst. However, the stoichiometric air-fuel ratio cannot be achieved and hence exhaust emissions cannot be effectively removed. Accordingly, advanced emission performance cannot be achieved.

To solve such a problem, a technique is proposed in which even in the case where the entire-range stoichiometric air-fuel ratio operation is performed, the temperature of the three-way catalyst is prevented from exceeding the allowable temperature (Japanese Patent Laid-Open No. H08-158896). In this technique, a second throttle valve is provided in addition to an original throttle valve. By adjusting this second throttle valve, the upper limit of the throttle opening degree is regulated in such a way as to prevent the temperature of the three-way catalyst from exceeding the allowable temperature.

SUMMARY

Problems to be Solved

When the technique of Japanese Patent Laid-Open No. H08-158896 is applied, it is possible to prevent the temperature of the three-way catalyst from exceeding the allowable temperature even in the case where the entire-range stoichiometric air-fuel ratio operation is performed.

However, in the technique of Japanese Patent Laid-Open No. H08-158896, the throttle opening degree is regulated. Therefore, the intake air charge amount becomes lower than a required amount, thus causing insufficient output from the engine. As a result, situations may occur in which the vehicle speed does not increase even when the accelerator is depressed. An automatic transmission is not shifted up if the vehicle speed is not increased. The vehicle cannot travel according to the manipulation performed by the driver and hence the driving performance of the vehicle decreases.

In view of the above, the present disclosure provides a technique that can perform an entire-range stoichiometric air-fuel ratio operation with a three-way catalyst held at an appropriate temperature, and that can also suppress the lowering of the driving performance of the vehicle.

Means for Solving the Problems

The disclosed technology relates to a powertrain control device for a vehicle including an engine that operates by combustion of gasoline, an exhaust gas purification apparatus that purifies, using a three-way catalyst, exhaust gas exhausted from the engine, and an automatic transmission that automatically changes an output from the engine, the vehicle traveling by controlling the engine and the automatic transmission.

The powertrain control device includes an engine control module and a transmission control module.

The engine control module performs an entire-range stoichiometric air-fuel ratio operation control of controlling operation of the engine such that a stoichiometric air-fuel ratio is achieved over an entire operation range. The engine control module also performs intake air charge amount limit control of limiting an intake air charge amount when the intake air charge amount reaches an upper limit value that is set to prevent a temperature of the three-way catalyst from exceeding an allowable temperature.

The transmission control module performs automatic shift control of controlling an action of the automatic transmission based on a shift map set based on an accelerator opening degree and a vehicle speed. The transmission control module also performs forced upshift control of forcibly shifting up the automatic transmission when an engine revolution speed reaches a revolution limit that is set to prevent revolution of the engine from exceeding an allowable limit.

When the engine control module limits the intake air charge amount, the transmission control module performs revolution limit change control of lowering the revolution limit.

That is, according to this powertrain control device, the entire-range stoichiometric air-fuel ratio operation control is performed and hence it is possible to always maintain a high purification rate of the exhaust gas purification apparatus. Accordingly, advanced emission performance can be achieved.

The intake air charge amount limit control is performed and hence even when the entire-range stoichiometric air-fuel ratio operation control is performed, it is possible to suppress thermal deterioration of the three-way catalyst. However, as described above, when the intake air charge amount is limited by the intake air charge amount limit control, the output from the engine becomes insufficient. As a result, situations may occur in which the vehicle speed does not increase even when the accelerator is depressed. The vehicle cannot travel according to the manipulation performed by the driver and hence the driving performance of the vehicle decreases.

To solve such a problem, this powertrain control device is configured such that when the engine revolution speed reaches the revolution limit, to prevent excessive revolution of the engine, the forced upshift control of forcibly shifting up the automatic transmission is performed. The powertrain control device is devised such that by utilizing this forced upshift control, power from the engine can be obtained and the vehicle speed can be increased even when the intake air charge amount limit control is performed.

That is, when the engine control module limits the intake air charge amount, the transmission control module performs the revolution limit change control of lowering the revolution limit. By lowering the revolution limit, the engine revolution speed reaches the revolution limit at a normal engine revolution speed, which is lower than excessive revolution. When the engine revolution speed reaches this revolution limit, the automatic transmission is forcibly shifted up by the forced upshift control.

Therefore, the gear ratio of the automatic transmission is reduced and the engine revolution speed is reduced with the vehicle speed maintained. When the engine revolution speed is reduced, limitation on the intake air charge amount is eased in turn. Accordingly, the engine can obtain power. The engine revolution speed and the vehicle speed are increased and hence it is also possible to suppress the lowering of the driving performance of the vehicle.

Different amounts of decrease in the revolution limit in the revolution limit change control may be set for a high gear stage and a low gear stage of the automatic transmission, and an amount of decrease for the high gear stage may be greater than an amount of decrease for the low gear stage.

With such a configuration, a lower speed stage can increase a vehicle speed to a high vehicle speed more quickly. The lowering of the driving performance of the vehicle can be further suppressed.

It is preferable that a smaller upper limit value of the intake air charge amount be set for a larger value of at least any one of the engine revolution speed, an intake air temperature, and a temperature of coolant in the engine.

These state values have a high correlation with the upper limit value of the intake air charge amount. That is, the amount of exhaust heat from the engine increases as the engine revolution speed increases, leading to an increase in the temperature of the three-way catalyst. Accordingly, it is preferable that a smaller upper limit value of the intake air charge amount, that is, stricter limitation, be set for a higher engine revolution speed.

It is possible to achieve both suppression of thermal deterioration of the three-way catalyst and suppression of a reduction in the output from the engine in a well-balanced manner. The same also applies to the intake air temperature and the temperature of coolant in the engine.

When it is determined that there is a high possibility of the temperature of the three-way catalyst exceeding the allowable temperature, the upper limit value of the intake air charge amount may be calculated based on three values consisting of the engine revolution speed, the intake air temperature, and the temperature of coolant in the engine, and based on a predetermined base state value.

That is, in the high risk state, there is a high possibility of the intake air charge amount being limited. The limitation on the intake air charge amount reduces the output from the engine. Accordingly, to suppress a reduction in the output from the engine, it is preferable that the upper limit value of the intake air charge amount have high reliability.

Thus, in this powertrain control device, three state values having a high correlation are detected. Then, the upper limit value of the intake air charge amount is calculated based on these detected values and the predetermined base state value. With such a configuration, it is possible to obtain the upper limit value of the intake air charge amount with high estimation accuracy. It is possible to suppress a reduction in the output from the engine.

When it is determined that there is a low possibility of the temperature of the three-way catalyst exceeding the allowable temperature, the upper limit value of the intake air charge amount may be calculated based on two values consisting of the engine revolution speed and the intake air temperature, and based on the predetermined base state value.

The temperature of the three-way catalyst greatly depends particularly on engine revolution speed and intake air temperature. In the low risk state, there is a low possibility of the intake air charge amount being limited. Accordingly, with this calculation method, it is possible to calculate the upper limit value of the intake air charge amount having required and sufficient reliability with a simple arithmetic operation. This method is efficient and can reduce burden on the arithmetic operation for control.

In the case where the engine includes a swirl control valve that changes a strength of a swirl flow generated in a combustion chamber by adjusting an opening degree of the swirl control valve, the upper limit value of the intake air charge amount may be corrected based on an amount of deviation of the opening degree of the swirl control valve relative to the base state value.

A deviation in the opening degree of the swirl valve causes a variation in the calculation of the upper limit value of the intake air charge amount. Accordingly, by correcting the upper limit value of the intake air charge amount based on the amount of deviation, it is possible to estimate the upper limit value of the intake air charge amount with higher accuracy.

In the case where the engine includes a variable valve timing mechanism that enables adjustment of an opening/closing timing of an intake valve and/or an exhaust valve, the upper limit value of the intake air charge amount may be corrected based on an amount of deviation of the opening/closing timing of the intake valve and/or the exhaust valve relative to the base state value.

A deviation in opening/closing timing causes a variation in the calculation of the upper limit value of the intake air charge amount. Accordingly, by correcting the upper limit value of the intake air charge amount based on the amount of deviation, it is possible to estimate the upper limit value of the intake air charge amount with higher accuracy.

In the case where the engine includes an exhaust gas recirculation (EGR) valve that changes an amount of exhaust gas to be recirculated by adjusting an opening degree of the EGR valve, the upper limit value of the intake air charge amount may be corrected based on an amount of deviation of the opening degree of the EGR valve relative to the base state value.

A deviation in the opening degree of the EGR valve causes a variation in the calculation of the upper limit value of the intake air charge amount. Accordingly, by correcting the upper limit value of the intake air charge amount based on the amount of deviation, it is possible to estimate the upper limit value of the intake air charge amount with higher accuracy.

In the case where the engine control module further performs ignition retard control of performing control in such a way as to cause a delay in ignition timing in order to suppress knocking, the upper limit value of the intake air charge amount may be corrected based on an amount of retard of the ignition timing relative to the base state value.

An amount of retard causes a variation in the calculation of the upper limit value of the intake air charge amount. Accordingly, by correcting the upper limit value of the intake air charge amount based on the amount of retard, it is possible to estimate the upper limit value of the intake air charge amount with higher accuracy.

In the case in which the transmission control module performs the revolution limit change control, when an acceleration of the vehicle is equal to or less than an acceleration feeling recognition boundary value set in advance, an early forced upshift control of forcibly shifting up the automatic transmission may be performed at a point in time when an engine revolution speed has reached a predetermined engine revolution speed that is lower than a temporary revolution limit set by the revolution limit change control. As used herein, the term "acceleration feeling recognition boundary value" means a boundary value of the degree of the range of acceleration in which the driver can recognize the feeling of acceleration.

When the above-described control is performed, power of the engine itself is limited in the case in which the vehicle is accelerated with the engine operating at a high revolution and a high load. Accordingly, there may be cases in which the driver perceives that an engine sound is noisy during acceleration.

In contrast, when such an early forced upshift control is performed, the engine revolution speed is reduced at an early timing. Correspondingly the engine sound decreases and the engine sound can be suppressed. When the acceleration of the vehicle is higher than the acceleration feeling recognition boundary value, the driver can feel acceleration. However, when the acceleration of the vehicle is lower than the acceleration feeling recognition boundary value, the driver does not feel acceleration anymore. In contrast, when the early forced upshift control is performed, the gear ratio changes and hence it is possible to eliminate the feeling of sluggishness. Accordingly, it is possible to ensure the feeling of acceleration.

The early forced upshift control may be performed only in a case in which the acceleration of the vehicle after upshifting is predicted to be equal to or greater than a deceleration feeling recognition boundary value set in advance.

With such a configuration, the acceleration of the automobile can be maintained in a stable manner within a range in which the driver can obtain the feeling of acceleration. Accordingly, in the range in which the feeling of acceleration after the upshifting can be ensured, there is no possibility of the driver feeling sluggish acceleration before the upshifting.

The early forced upshift control may be performed only in a case in which the engine revolution speed is at a predetermined high revolution in a specific gear stage of the automatic transmission.

That is, the early forced upshift control is particularly effective and provides excellent effects in a specific gear stage and a predetermined engine revolution speed at which the driver feels sluggish acceleration due to the execution of the forced upshift control.

Advantageous Effects

According to the powertrain control device to which the disclosed technology is applied, it is possible to perform the entire-range stoichiometric air-fuel ratio operation with the three-way catalyst held at an appropriate temperature. Furthermore, it is also possible to suppress a reduction in response to vehicle speed caused by insufficient output from the engine. Therefore, it is possible to achieve advanced emission performance in an engine vehicle without impairing driving performance.

BRIEF DESCRIPTION OF DRAWINGS

FIG. 6 is a table showing a specific example of revolution limits.

FIG. 14 is a table showing a specific example of revolution limits in the modification.

DETAILED DESCRIPTION

Hereinafter, the disclosed technology will be described. However, the following description is merely illustrative.

<Powertrain>

Figure 1:
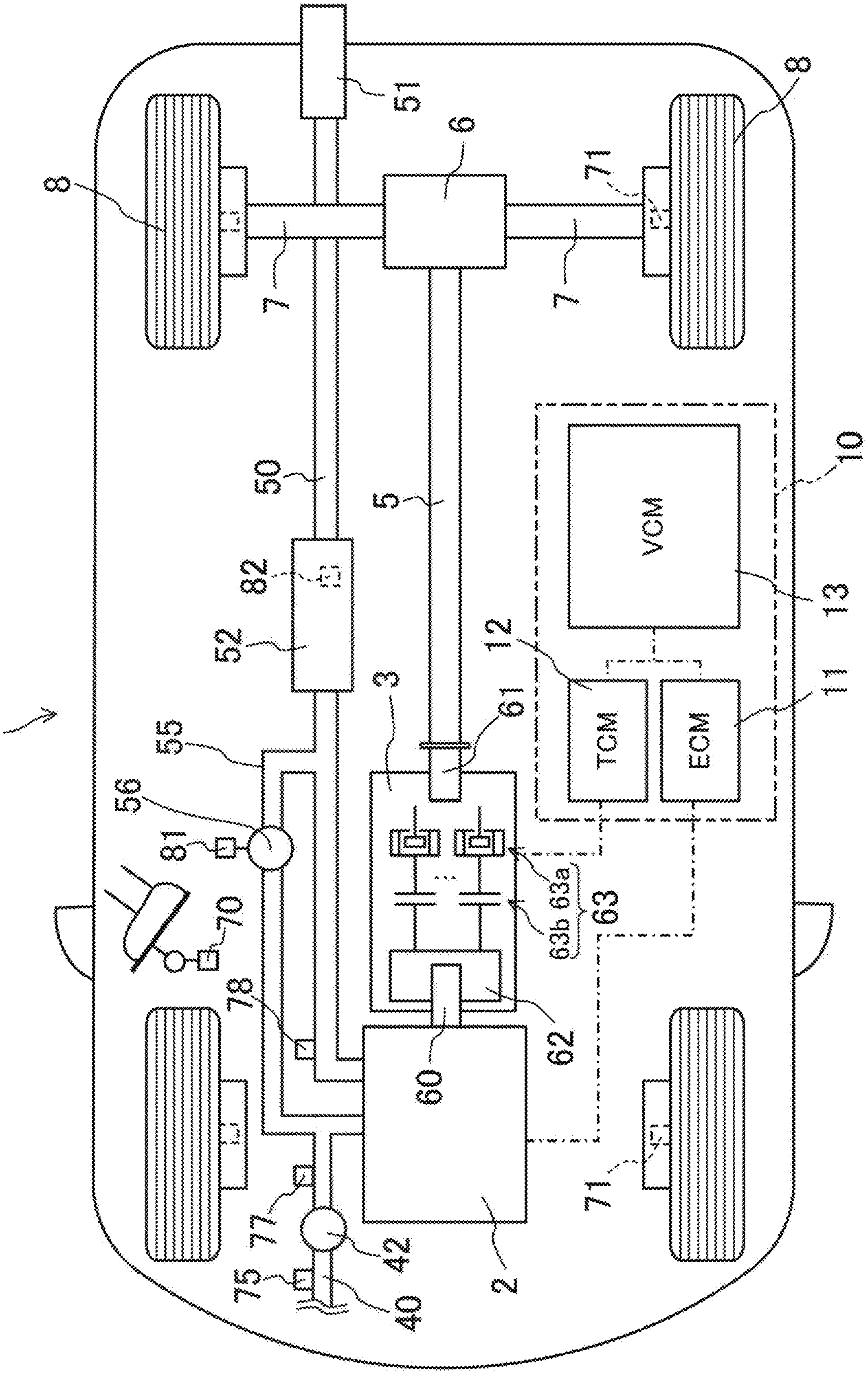
FIG. 1 is a diagram showing the main configuration of an automobile to which the disclosed technology is applied.

FIG. 1 shows an automobile 1 (an example of a vehicle) to which the disclosed technology is applied. In the automobile 1, an engine 2 is mounted as a drive source (a so-called engine vehicle). The engine 2 is disposed at the front part (engine room) of the automobile 1. The automobile 1 travels by driving the engine 2.

(Engine)

The engine 2 is a reciprocating engine that operates by combustion of gasoline through four strokes consisting of intake, compression, expansion, and exhaust. That is, fuel for this engine 2 is gasoline. However, the fuel can be any fuel that is mainly composed of gasoline and may partially contain components that are not gasoline.

Figure 2:
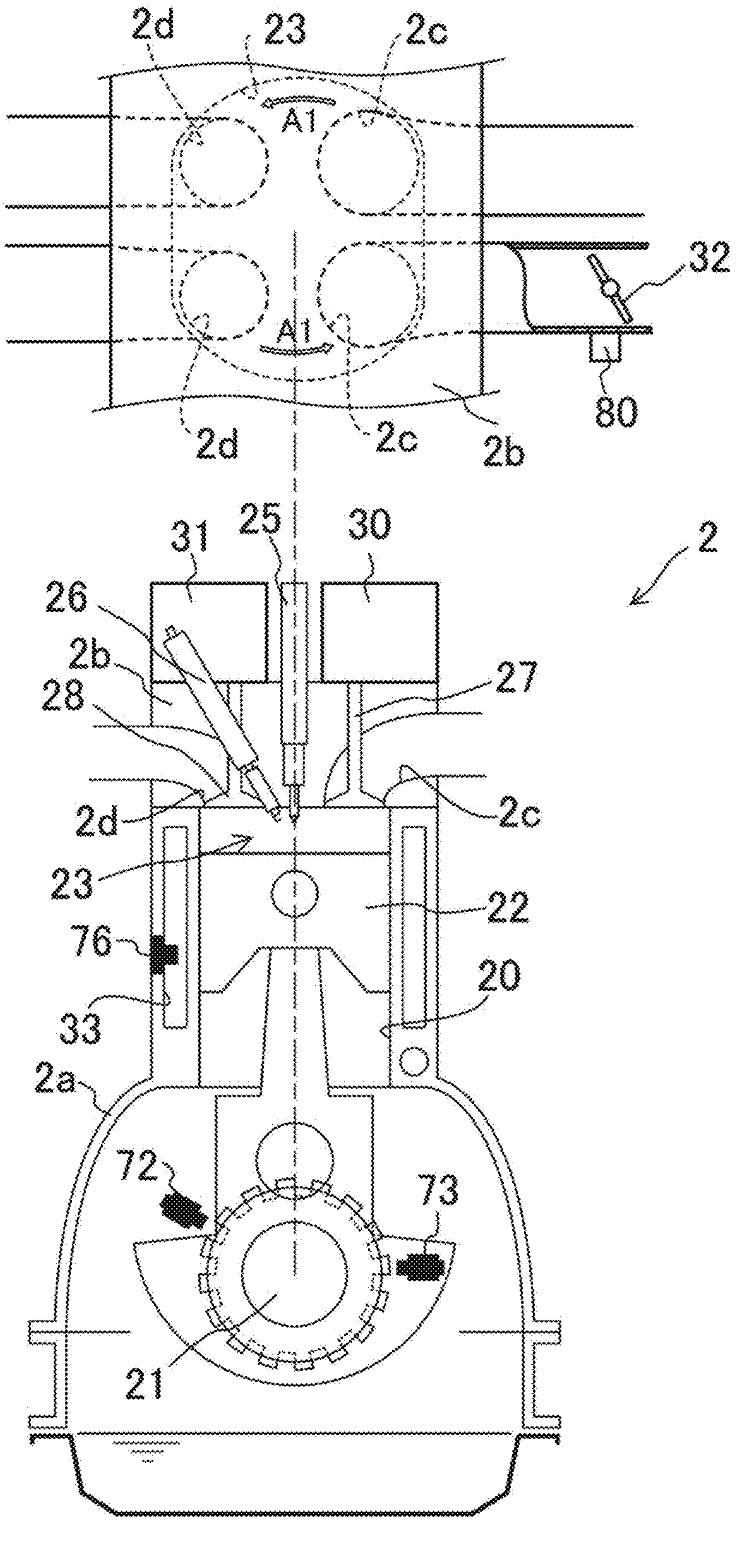
FIG. 2 is a diagram showing the main configuration of an engine.

The engine 2 includes four cylinders 20 disposed in series. FIG. 2 shows the structure of the engine 2. FIG. 2 shows one cylinder 20. A piston 22 coupled to a crankshaft 21 is inserted into each cylinder 20 formed in an engine block 2*a*. A combustion chamber 23 is defined by the piston 22 at the upper part of the cylinder 20.

A cylinder head 2*b* is provided with, for each cylinder 20, an injection valve 25, a spark plug 26, a pair of intake valves 27, 27, a pair of exhaust valves 28, 28, an intake continuous variable valve timing mechanism (intake S-VT) 30, an exhaust continuous variable valve timing mechanism (exhaust S-VT) 31, a swirl control valve (SCV) 32, and the like.

The injection valve 25 is attached to the cylinder head 2*b* such that the injection port of the injection valve 25 faces the combustion chamber 23. Gasoline is pressure-fed to the injection valve 25 by a fuel supply system not shown in the drawing. The injection valve 25 injects gasoline into the combustion chamber 23.

The spark plug 26 is attached to the cylinder head 2*b* such that the electrode of the spark plug 26 faces the combustion chamber 23. The spark plug 26 ignites an air-fuel mixture formed in the combustion chamber 23.

As shown in the upper diagram in FIG. 2, the cylinder head 2*b* has a pair of intake ports 2*c*, 2*c*. Each of these intake ports 2*c*, 2*c* is provided with an intake valve 27 that opens and closes the passage of the intake port 2*c*. Each intake valve 27 is opened and closed at a predetermined timing by driving the intake S-VT 30.

The cylinder head 2*b* also has a pair of exhaust ports 2*d*, 2*d*. Each of these exhaust ports 2*d*, 2*d* is provided with an exhaust valve 28 that opens and closes the passage of the exhaust port 2*d*. Each exhaust valve 28 is opened and closed at a predetermined timing by driving the exhaust S-VT 31.

The SCV 32 is disposed upstream of one of the intake ports 2*c*, 2*c*. By adjusting the opening degree of the SCV 32, the strength of a swirl flow that cycles in the combustion chamber 23 is changed.

That is, when the opening degree of the SCV 32 is large, there is almost no difference between the flow rates of intake air that flows into the combustion chambers 23 from the respective intake ports 2*c*. Accordingly, almost no swirl flow is generated. In contrast, when the opening degree of the SCV 32 is small, a difference occurs between the flow rates of intake air that flows into the combustion chambers 23 from two intake ports 2*c*, 2*c*. Therefore, a swirl flow is generated as shown by arrows A1 in FIG. 2. A smaller opening degree of the SCV 32 causes a stronger swirl flow.

The engine 2 (the cylinder head 2*b* and the engine block 2*a*) has a coolant passage 33 through which coolant circulates. Coolant at a low temperature flows into the coolant passage 33. The coolant is heated due to heat exchange with the engine 2, thus being increased in temperature to a high temperature and thereafter flows out from the coolant passage 33. The coolant circulates through the engine 2, cooling the engine 2.

As shown in FIG. 1, an intake passage 40 is connected to the engine 2. The intake passage 40 communicates with the intake ports 2*c* of the respective cylinders 20 via an intake manifold. A throttle valve 42 is provided on the intake passage 40. By adjusting the opening degree of the throttle valve 42, the amount of air (fresh air) to be supplied to the combustion chambers 23 is changed.

An exhaust passage 50 is connected to the engine 2. The upstream side of the exhaust passage 50 communicates with the exhaust ports 2*d* of the respective cylinders 20. The downstream side of the exhaust passage 50 communicates with a muffler 51 provided at the rear part of the automobile 1. Exhaust gas generated in the respective combustion chambers 23 is exhausted to an area behind the automobile 1 through the exhaust passage 50.

An exhaust gas purification apparatus 52 is provided on the exhaust passage 50. The exhaust gas purification apparatus 52 includes a three-way catalyst. That is, the exhaust gas purification apparatus 52 purifies exhaust gas using the three-way catalyst.

An exhaust gas recirculation (EGR) passage 55 that causes recirculation of exhaust gas is connected between the intake passage 40 and the exhaust passage 50. The EGR passage 55 causes a portion of exhaust gas to recirculate into the intake passage 40. An EGR valve 56 is provided to the EGR passage 55. By adjusting the opening degree of the EGR valve 56, the amount of exhaust gas to be recirculated is changed. Therefore, an EGR rate is changed.

(Automatic Transmission)

The automobile 1 also includes a multi-stage automatic transmission 3 (a so-called AT). The automatic transmission 3 automatically changes an output from the engine 2.

An input shaft 60 of the automatic transmission 3 is coupled to the crankshaft 21 of the engine 2. An output shaft 61 of the automatic transmission 3 is coupled to a differential gear 6 via a propeller shaft 5. A torque converter 62 and a transmission mechanism 63 are assembled between the input shaft 60 and the output shaft 61.

The transmission mechanism 63 is constituted of a plurality of planetary gear mechanisms 63*a*, a plurality of clutches 63*b* (including a brake), and the like. By shifting the transmission mechanism 63, forward movement or backward movement can be shifted, or a gear ratio between the input shaft 60 and the output shaft 61 of the automatic transmission 3 can be changed to a different gear ratio, that is, a gear stage can be shifted.

For example, the input side of each clutch 63*b* is configured to be coupled to the input shaft 60 via the torque converter 62. The output side of each clutch 63*b* is coupled to the output shaft 61 via the corresponding planetary gear mechanism 63*a*.

When a particular clutch 63*b* is selected and this clutch 63*b* becomes engaged, the input shaft 60 and the output shaft 61 are coupled to each other via this clutch 63*b* and the planetary gear mechanism 63*a* that corresponds to this clutch 63*b*. As a result, the gear stage is shifted.

In the case of this automatic transmission 3, gear stages from a first gear stage to a sixth gear stage are provided as will be described later. The output from the engine 2 is changed by the automatic transmission 3 and then transmitted to the differential gear 6 via the propeller shaft 5.

The differential gear 6 is coupled to left and right driving wheels 8 via a pair of axles 7, 7. The output from the engine 2 is distributed to the respective axles 7 by the differential gear 6, and is transmitted to the respective driving wheels 8. As a result, the automobile 1 travels.

<Powertrain Control Device>

A powertrain control device 10 that controls the above-described powertrain is also mounted in the automobile 1. The powertrain control device 10 is constituted of an engine control module (ECM) 11, a transmission control module (TCM) 12, a vehicle control module (VCM) 13, and the like.

The VCM 13 is a host module for the ECM 11 and the TCM 12. The VCM 13 comprehensively controls the ECM 11 and the TCM 12.

Each of the ECM 11, the TCM 12, and the VCM 13 is constituted of pieces of hardware such as a processor, memory, and an interface, and software such as a database and a control program. These modules are connected to each other by a Controller Area Network (CAN), for example, and are configured to be capable of performing electrical communication with each other.

The configuration of the powertrain control device 10 may be modified according to specifications. For example, the powertrain control device 10 may be constituted of one module, or may be constituted of a larger number of modules.

<Various Sensors>

As shown in FIG. 1 and FIG. 2, various sensors are attached to the powertrain. To be more specific, an accelerator opening degree sensor 70, a vehicle speed sensor 71, an engine revolution speed sensor 72, a crank angle sensor 73, an airflow sensor 75, a coolant temperature sensor 76, an intake air temperature sensor 77, an exhaust gas temperature sensor 78, an SCV opening degree sensor 80, an EGR valve opening degree sensor 81, and a catalyst temperature sensor 82 are attached to the powertrain.

Figure 3:
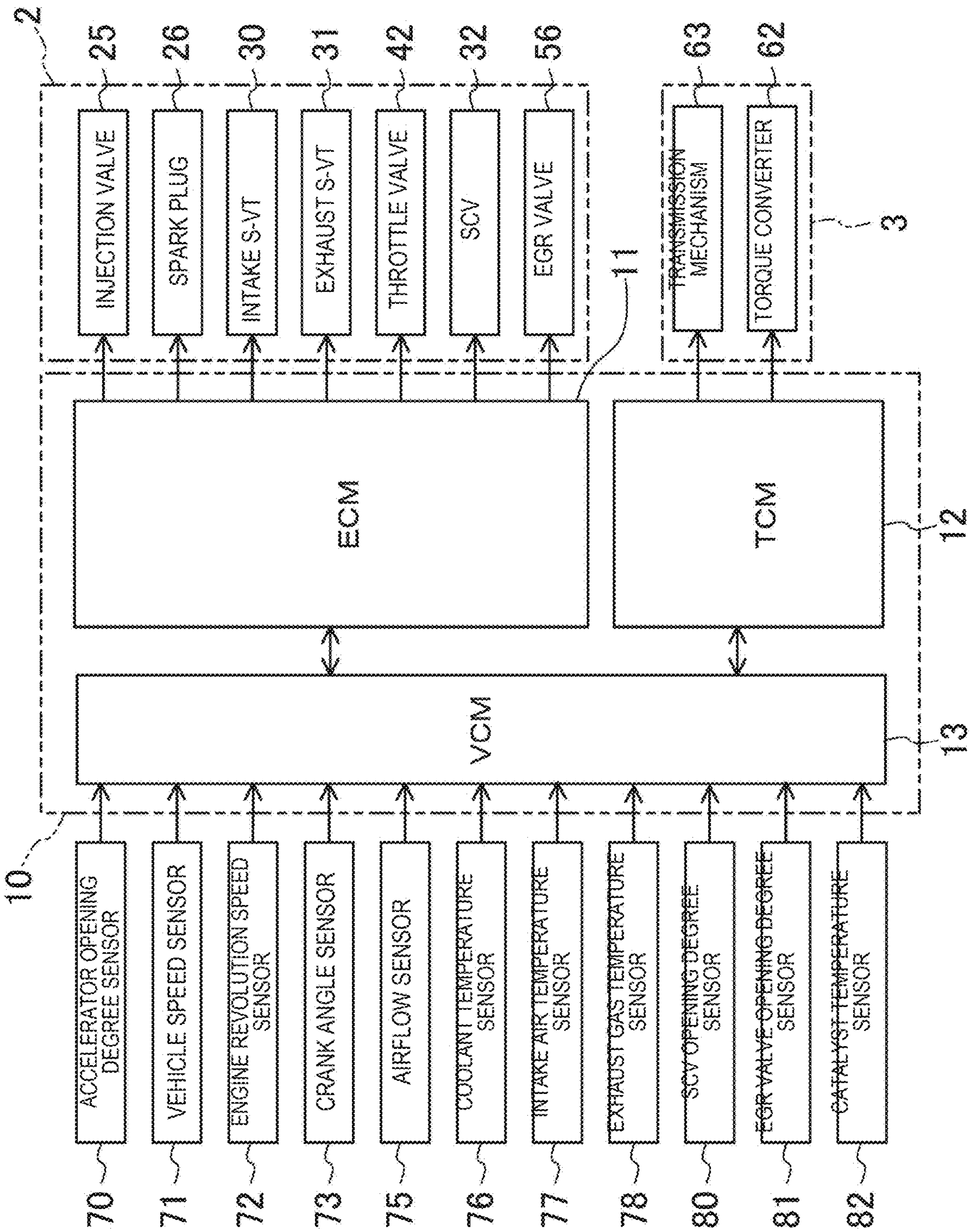
FIG. 3 is a block diagram showing the relationship between a powertrain control device and main related equipment of the powertrain control device.

The powertrain control device 10 controls the engine 2 and the automatic transmission 3 in cooperation with these sensors. FIG. 3 is a block diagram showing the relationship between these various sensors, the powertrain control device 10, the engine 2, and the automatic transmission 3.

The accelerator opening degree sensor 70 is attached to an accelerator pedal. The accelerator opening degree sensor 70 detects an accelerator opening degree that corresponds to manipulation of the accelerator pedal. The vehicle speed sensor 71 is attached to the hub or the like of the wheel. The vehicle speed sensor 71 detects the speed of the automobile 1.

The engine revolution speed sensor 72 is attached to the engine 2. The engine revolution speed sensor 72 detects the revolution speed of the engine 2. The crank angle sensor 73 is also attached to the engine 2. The crank angle sensor 73 detects the rotation angle of the crankshaft 21. The airflow sensor 75 is attached to the intake passage 40. The airflow sensor 75 detects the flow rate of fresh air that flows through the intake passage 40.

The coolant temperature sensor 76 is attached to the engine 2. The coolant temperature sensor 76 detects the temperature of coolant. The intake air temperature sensor 77 is attached to the intake passage 40. The intake air temperature sensor 77 detects the temperature of fresh air. The exhaust gas temperature sensor 78 is attached to the exhaust passage 50. The exhaust gas temperature sensor 78 detects the temperature of exhaust gas exhausted from the combustion chambers 23.

The SCV opening degree sensor 80 is attached to the SCV 32. The SCV opening degree sensor 80 detects the opening degree of the SCV 32. The EGR valve opening degree sensor 81 is attached to the EGR valve 56. The EGR valve opening degree sensor 81 detects the opening degree of the EGR valve 56. The catalyst temperature sensor 82 is attached to the exhaust gas purification apparatus 52. The catalyst temperature sensor 82 detects the temperature of the three-way catalyst.

These sensors output detection signals to the VCM 13. The VCM 13 suitably processes the inputted detection signals and thereafter output the detection signals to the ECM 11 and the TCM 12 when necessary. As described above, the VCM 13 is configured to be capable of performing electrical communication with the ECM 11 and the TCM 12. The ECM 11 and the TCM 12 can perform electrical communication with each other via the VCM 13.

The ECM 11 is a module that mainly controls the action of the engine 2. That is, the ECM 11 is electrically connected to the injection valve 25, the spark plug 26, the intake S-VT 30, the exhaust S-VT 31, the throttle valve 42, the SCV 32, and the EGR valve 56. The ECM 11 outputs control signals to these components to control the actions of these components.

The TCM 12 is a module that mainly controls the action of the automatic transmission 3. That is, the TCM 12 is electrically connected to the transmission mechanism 63 and the torque converter 62. The TCM 12 outputs control signals to these components to control the actions of these components.

Based on the detection signals inputted from the various sensors, the VCM 13, the ECM 11, and the TCM 12 constituting the powertrain control device 10 control the engine 2 and the automatic transmission 3 in cooperation with each other. As a result, the automobile 1 travels.

<Control of Engine>

The ECM 11 controls the engine 2 in such a way that power that corresponds to the driver's request will be output. In the case of this automobile 1, to achieve advanced emission performance in particular, the ECM 11 performs entire-range stoichiometric air-fuel ratio operation control of controlling the operation of the engine 2 such that a stoichiometric air-fuel ratio is achieved over the entire operation range.

As described above, the exhaust gas purification apparatus 52 purifies exhaust gas using the three-way catalyst. To obtain a high purification rate of the three-way catalyst, it is necessary to stabilize an air-fuel ratio at a stoichiometric air-fuel ratio (14.7) or within a narrow range around the stoichiometric air-fuel ratio (so-called window). For this reason, to achieve advanced emission performance, it is necessary to operate the engine 2 within this window over the entire operation range of the engine 2.

Accordingly, the ECM 11 performs control such that, even when the engine revolution speed and the load are changed to high values or low values, the air-fuel ratio (A/F) remains at the stoichiometric air-fuel ratio ($\lambda$=1), that is, remains within the range of the window (the target air-fuel ratio being uniformly $\lambda$1). Therefore, it is possible to always hold the exhaust gas purification apparatus 52 in an optimal state for purification. Advanced emission performance can be achieved.

In contrast, when the stoichiometric air-fuel ratio is achieved in an operation range with a large amount of heat in exhaust gas, for example, in a range with a high engine revolution speed and a high load, the amount of exhaust heat is further increased due to efficient combustion. As a result, the amount of heat in exhaust gas may be excessively increased, causing the temperature of the three-way catalyst to exceed an allowable temperature. When the temperature of the three-way catalyst exceeds the allowable temperature, the three-way catalyst is thermally deteriorated and hence durability of the three-way catalyst decreases.

In view of the above, in the case of this automobile 1, to prevent the three-way catalyst from exceeding the allowable temperature, an upper limit value is set for an intake air charge amount. Further, when the intake air charge amount reaches this upper limit value, the ECM 11 performs intake air charge amount limit control of limiting an intake air charge amount in such a way as to prevent the intake air charge amount from exceeding the upper limit value.

That is, the ECM 11 cuts the intake air charge amount (the mass of fresh air to be charged into the combustion chamber 23 during combustion) by an amount corresponding to the excess from the upper limit value. The entire-range stoichiometric air-fuel ratio operation control is performed and hence the mass of fuel injected into the combustion chamber 23 is also reduced correspondingly. Combustion heat is reduced and hence the temperature of exhaust gas is also decreased. Accordingly, it is possible to prevent the three-way catalyst from exceeding the allowable temperature.

Actual limitation on the intake air charge amount is performed using charging efficiency (CE), which is a general indicator for the intake air charge amount. That is, a CE limit value is set in such a way as to correspond to the upper limit value of the intake air charge amount. The ECM 11 performs the intake air charge amount limit control based on a limit value for CE (CE limit value). In the intake air charge amount limit control, the CE limit value is adjusted in such a way as to prevent the temperature of the three-way catalyst from exceeding the allowable temperature.

That is, a higher engine revolution speed and a higher load cause a higher temperature of exhaust gas, leading to a strict value (small value) for the CE limit value. Particularly, engine revolution speed affects a rise in the temperature of exhaust gas more greatly than load does. Accordingly, a smaller CE limit value is set for a higher engine revolution speed.

CE is affected by dynamic factors, such as the pressure and the temperature of air to be charged, and by static factors, such as piping resistance of the intake passage 40. CE is an estimation value calculated based on a number of such factors. Estimation accuracy of CE varies depending on the calculation method. Accordingly, in this automobile 1, a method for calculating a CE limit value is devised such that appropriate estimation accuracy corresponding to a risk can be obtained (the details will be described later).

The ECM 11 also performs ignition retard control in order to suppress knocking. That is, during normal combustion, the ECM 11 controls the spark plug 26 such that ignition is achieved at an optimal timing in the vicinity of a top dead center. In contrast, when knocking starts to occur, the ECM 11 performs control in such a way as to cause a delay in ignition timing (ignition retard control). Due to the delay of the ignition timing, knocking can be suppressed.

<Control of Automatic Transmission>

The TCM 12 controls the automatic transmission 3 to change the output from the engine 2 according to a traveling state of the automobile 1. A predetermined shift map 90 is included in the TCM 12 in advance. Based on this shift map 90, the TCM 12 performs automatic shift control of automatically controlling the action of the automatic transmission 3.

Figure 4:
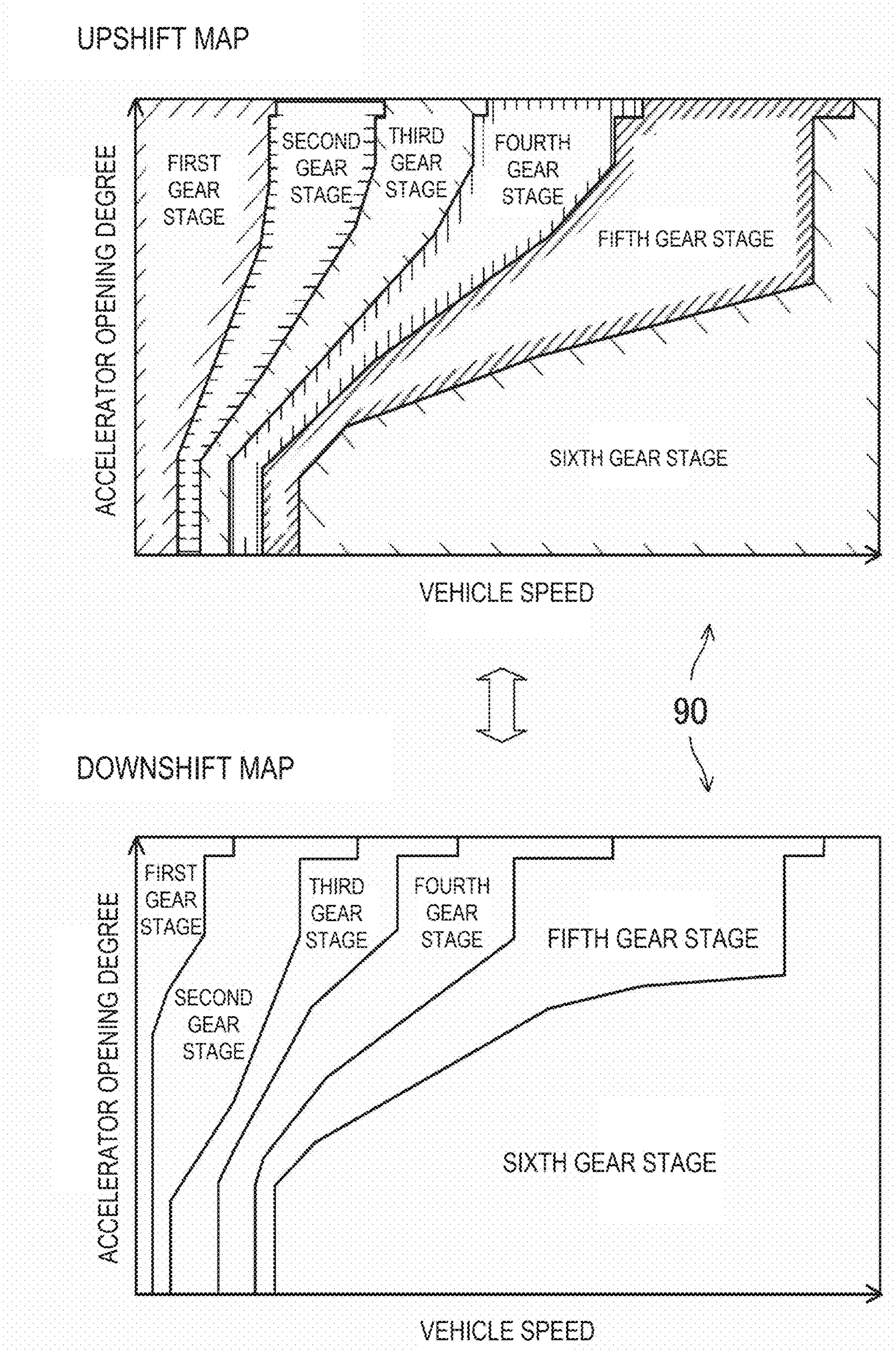
FIG. 4 shows an example of a shift map.

FIG. 4 shows the shift maps 90 as an example. As described above, the automatic transmission 3 has gear stages from the first gear stage to the sixth gear stage. A shift map 90 corresponding to upshifting and a shift map 90 corresponding to downshifting are set based on accelerator opening degree and vehicle speed.

The upper diagram is the shift map 90 for upshifting. The lower diagram is the shift map 90 for downshifting. When the gear stage exceeds a boundary between two neighboring gear stages, the gear stage is shifted. For example, in the shift map 90 for upshifting, when the gear stage exceeds the boundary between the fifth gear stage and the sixth gear stage from the fifth gear stage to the sixth gear stage, the TCM 12 performs control of shifting up the gear stage from the fifth gear stage to the sixth gear stage. In the shift map 90 for downshifting, when the gear stage exceeds the boundary between the fourth gear stage to the third gear stage from the fourth gear stage to the third gear stage, the TCM 12 performs control of shifting down the gear stage from the fourth gear stage to the third gear stage.

The TCM 12 also performs forced upshift control of forcibly shifting up the automatic transmission 3 based on a revolution limit so as to prevent excessive revolution of the engine 2. The revolution limit is the upper limit value of engine revolution speed set in advance in the TCM 12 to prevent the revolution of the engine 2 from exceeding the allowable limit.

When the engine revolution speed reaches the revolution limit, the TCM 12 forcibly shifts up the automatic transmission 3 in addition to the above-described gear-shifting performed based on the shift map 90. When the automatic transmission 3 is shifted up, the gear ratio is reduced, so that the engine revolution speed is reduced. Accordingly, it is possible to prevent the engine revolution speed from exceeding the revolution limit.

<Problem of Intake Air Charge Amount Limit Control and Measures Against the Problem>

When the intake air charge amount is limited, the intake air charge amount becomes lower than an original required amount. Therefore, the output from the engine 2 becomes insufficient. As a result, situations may occur in which a vehicle speed does not increase even when the driver depresses the accelerator.

Figure 5A:
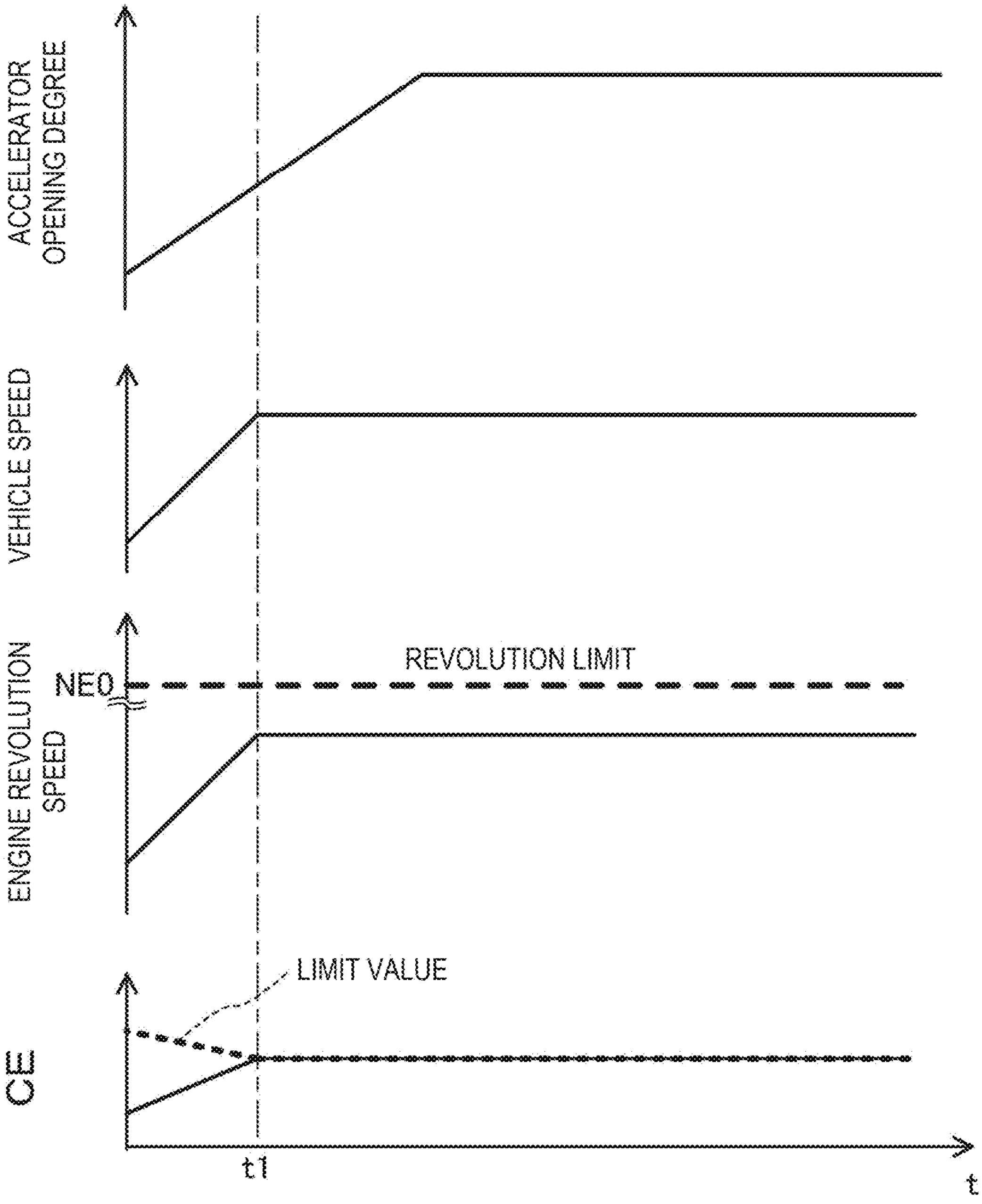
FIG. 5A is a diagram for illustrating a problem in an intake air charge amount limit control (conventional technology).

FIG. 5A shows, as an example, changes of main elements with time when the intake air charge amount is limited in conventional technology. A sufficiently large value is set for a normal revolution limit (NE0) according to performance of the engine 2. When the accelerator is depressed and the engine revolution speed is increased, CE increases correspondingly.

However, the amount of heat in exhaust gas is also increased. Accordingly, in the case in which the engine is operated in a range with a high load and high revolution, the temperature of the three-way catalyst rises and approaches the allowable temperature. Therefore, the CE limit value gradually moves toward a strict value (small value).

As a result, when CE reaches the CE limit value (time t1), CE (intake air charge amount) is limited (i.e., CE plateaus at the CE limit value) by the intake air charge amount limit control. Therefore, the output from the engine 2 does not increase anymore and hence the engine revolution speed plateaus as well. The vehicle speed is also not increased.

Even when the accelerator is further depressed, the engine revolution speed and the vehicle speed are not increased.

The vehicle speed is not changed and hence there is no possibility of the automatic transmission 3 being shifted up. The automobile 1 cannot travel according to the manipulation performed by the driver and hence the driving performance of the automobile 1 decreases.

In view of the above, this powertrain control device 10 is devised such that by using a revolution limit, the vehicle speed can be increased even when the output from the engine 2 is limited, and thus traveling can be achieved according to manipulation performed by the driver. To be more specific, when the ECM 11 limits CE, the TCM 12 performs revolution limit change control of lowering revolution limit.

Figure 5B:
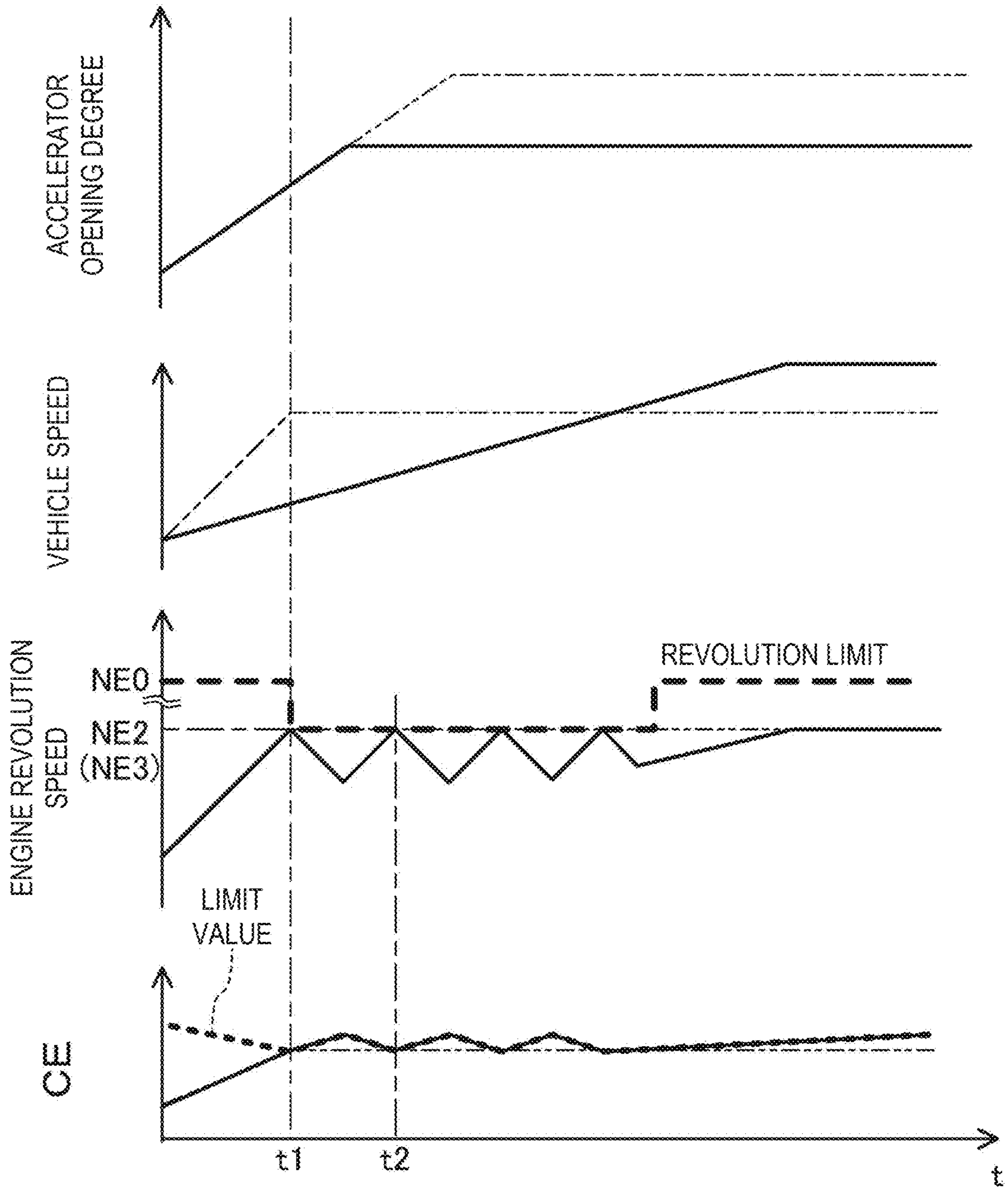
FIG. 5B is a diagram for illustrating a measure for improving the intake air charge amount limit control (disclosed technology).

FIG. 5B shows, as an example, changes of main elements with time when the intake air charge amount is limited by this powertrain control device 10. In the same manner as the conventional limitation, when the accelerator is depressed an engine revolution speed is increased, CE also increases correspondingly. In the case in which the engine is operated in a range with a high load and high revolution, the CE limit value gradually moves toward a strict value (small value).

As a result, when CE reaches the CE limit value (time t1), CE is limited by the intake air charge amount limit control. At this point, in this powertrain control device 10, the TCM 12 performs the revolution limit change control of lowering a revolution limit by a predetermined amount of decrease.

Temporary revolution limits are also set in the ECM 11 in addition to the normal revolution limit. FIG. 6 shows a table of revolution limits as an example. It is not particularly necessary to differentiate the original revolution limit for high gear stages and low gear stages, the original revolution limit corresponding to the allowable limit for the engine revolution speed. Accordingly, in this powertrain control device 10, as a normal revolution limit (RL-nor), a common first revolution speed (NE0) is set for gear stages from the first gear stage to the sixth gear stage.

In contrast, regarding revolution limits used in the revolution limit change control (temporary revolution limits: RL-temp), different revolution limits are set for the high gear stages and the low gear stages. To be more specific, an amount of decrease in temporary revolution limit for the high gear stages from the normal revolution limit is greater than an amount of decrease in temporary revolution limit for the low gear stages from the normal revolution limit.

In the case of the temporary revolution limits described as an example, a common second revolution speed (NE2) is set for the low-speed stages from the first gear stage to the third gear stage, and a common third revolution speed (NE3) is set for the high-speed stages from the fourth gear stage to the sixth gear stage. The second revolution speed is higher than the third revolution speed, and the first revolution speed is sufficiently higher than the second revolution speed (NE0>>NE2>NE3). As shown in a modification described later, it is not essential to set the revolution speed for the temporary revolution limits as two revolution speeds: a revolution speed for low-speed stages and a revolution speed for high-speed stages. A different revolution speed may be set for each gear stage, or revolution speeds may be set for arbitrarily defined stages, such as a low-speed stage, a middle-speed stage, and a high-speed stage.

By setting higher temporary revolution limits for the low-speed stages than for the high-speed stages, the upper limits of engine revolution speed for the low-speed stages become relatively high. Therefore, in the low-speed stages, it is possible to increase the vehicle speed to a high speed more quickly.

As shown in FIG. 5B, the TCM 12 performs the revolution limit change control to switch the normal revolution limit to the temporary revolution limit. Assuming that the automatic transmission 3 is in the second gear stage at this point, the second revolution speed (NE2) is set as the temporary revolution limit by performing the revolution limit change control.

The second revolution speed (NE2) is a revolution speed that may be achieved in the second gear stage when CE is limited. The second revolution speed (NE2) is also a revolution speed that may be achieved in the first gear stage or the third gear stage when CE is limited. Likewise, the third revolution speed (NE3) is a revolution speed that may be achieved in any of the fourth gear stage to the sixth gear stage when CE is limited.

When the engine revolution speed reaches the second revolution speed (NE2), the TCM 12 performs the forced upshift control to forcibly shift up the automatic transmission 3. The automatic transmission 3 is shifted from the second gear stage to the third gear stage. Therefore, the gear ratio of the automatic transmission 3 is reduced and hence the engine revolution speed is reduced. The vehicle speed is maintained.

Due to a reduction in engine revolution speed, limitation on CE is eased. That is, the CE limit value is increased. Therefore, the engine 2 can obtain power and hence the engine revolution speed and the vehicle speed are increased. When the engine revolution speed reaches the second revolution speed (NE2) (time t2), the TCM 12 performs the forced upshift control again to forcibly shift up the automatic transmission 3. The automatic transmission 3 is shifted from the third gear stage to the fourth gear stage.

Therefore, the engine revolution speed is reduced and the CE limit value is increased. The engine 2 can obtain power again and hence the engine revolution speed and the vehicle speed are increased. Such a state change is repeated until the gear stage reaches the sixth gear stage, which is the highest gear stage. Therefore, it is possible to obtain power from the engine 2 according to the manipulation of the accelerator each time upshifting is performed and hence the vehicle speed can be continuously increased.

Accordingly, it is possible to achieve traveling according to the manipulation performed by the driver. It is possible to suppress the lowering of the driving performance of the automobile 1. The power itself of the engine 2 is limited also in this measure. Accordingly, it is undeniable that an increase in vehicle speed is relatively gentle.

<Specific Example of Control of Powertrain Control Device>

Figure 7:
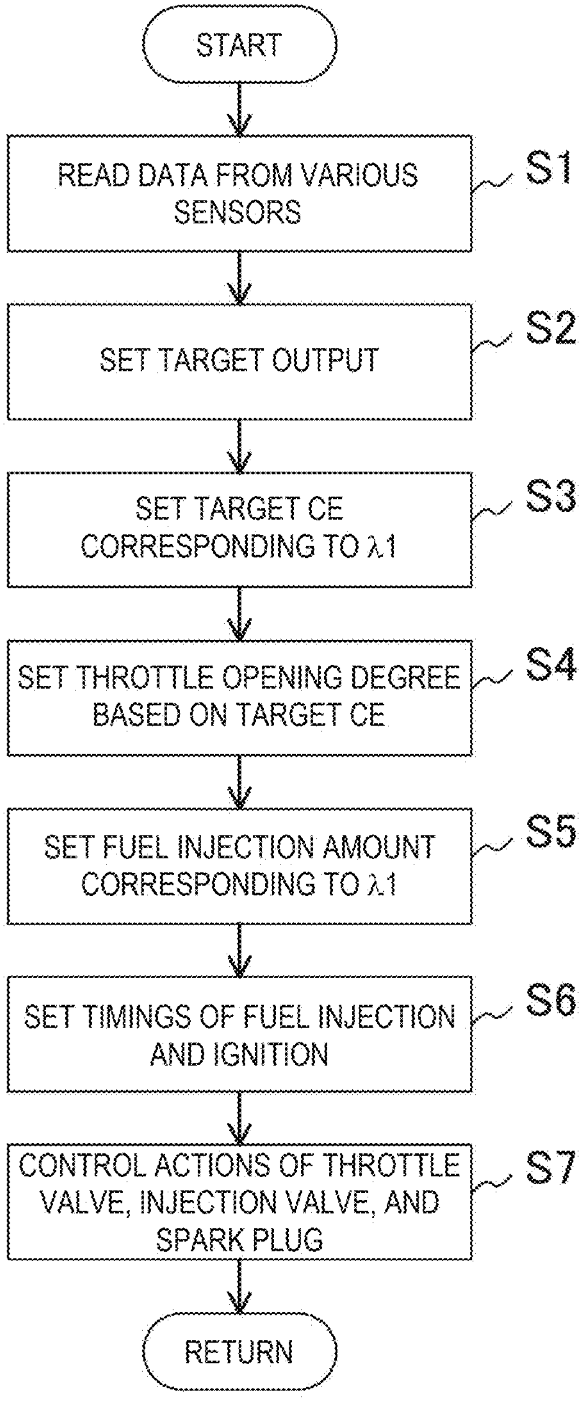
FIG. 7 shows an example of a flowchart related to an entire-range stoichiometric air-fuel ratio operation control.
Figure 8:
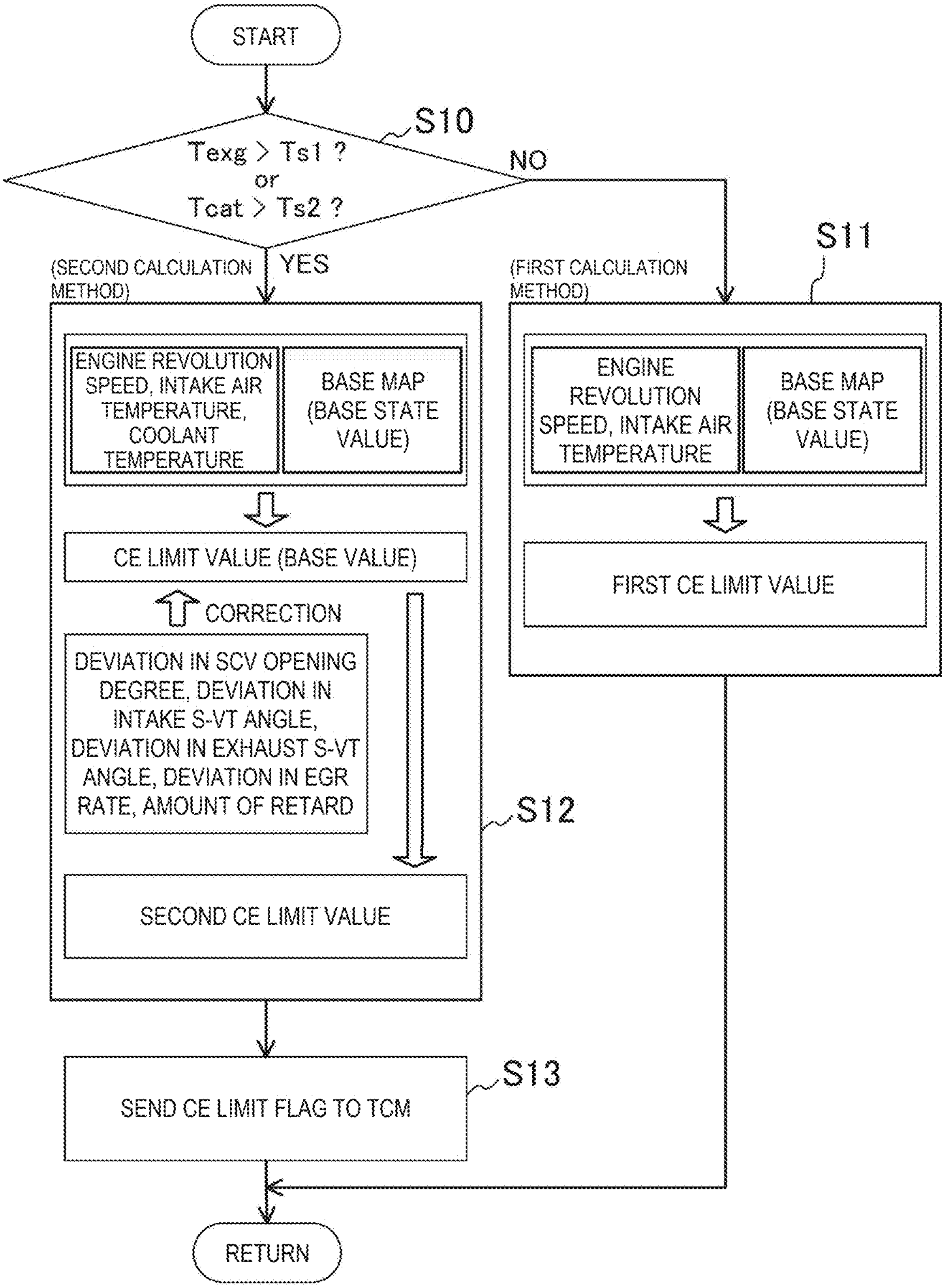
FIG. 8 shows an example of a flowchart related to the intake air charge amount limit control.
Figure 9A:
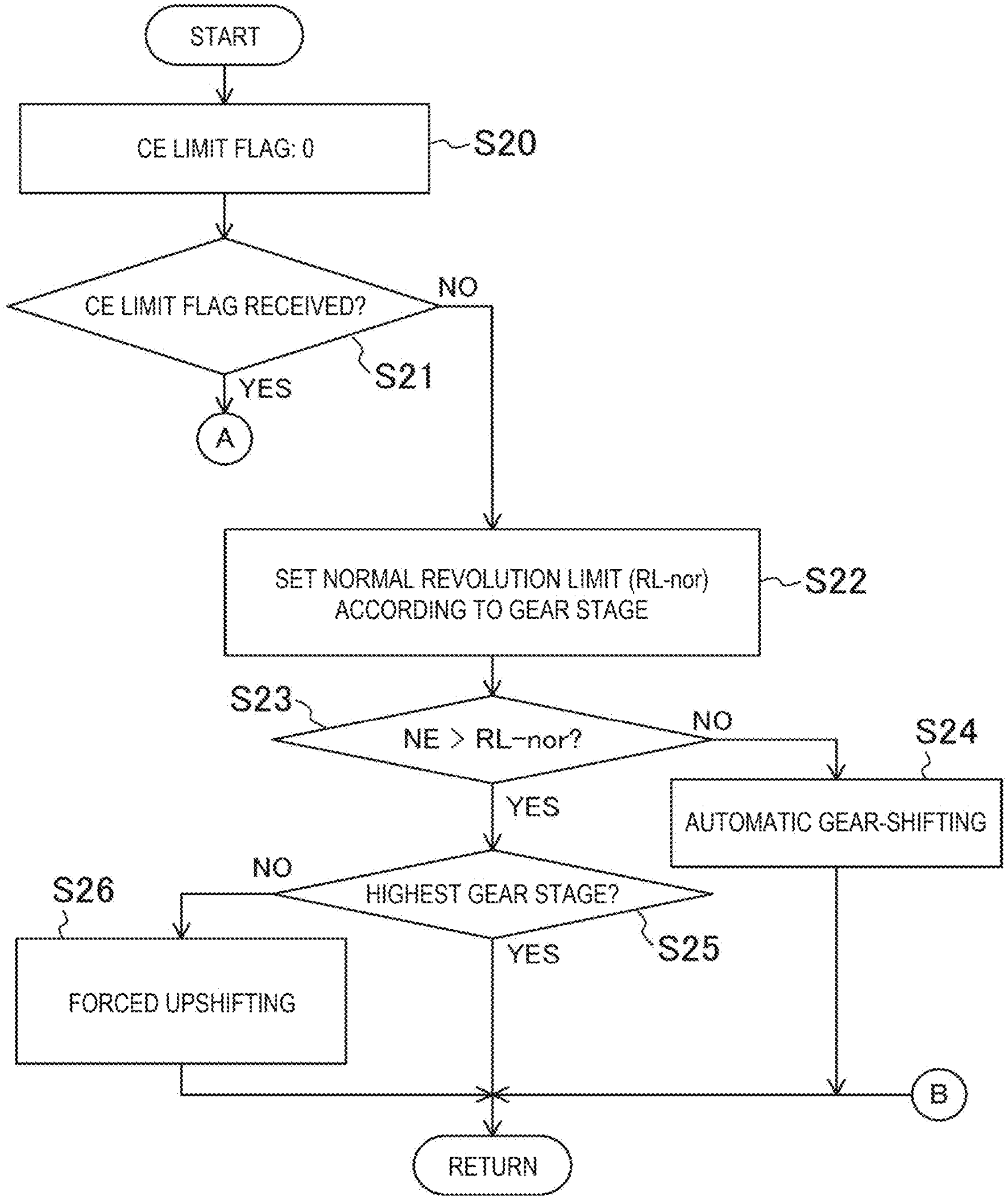
FIG. 9A shows an example of a flowchart related to a forced upshift control and a revolution limit change control.
Figure 9B:
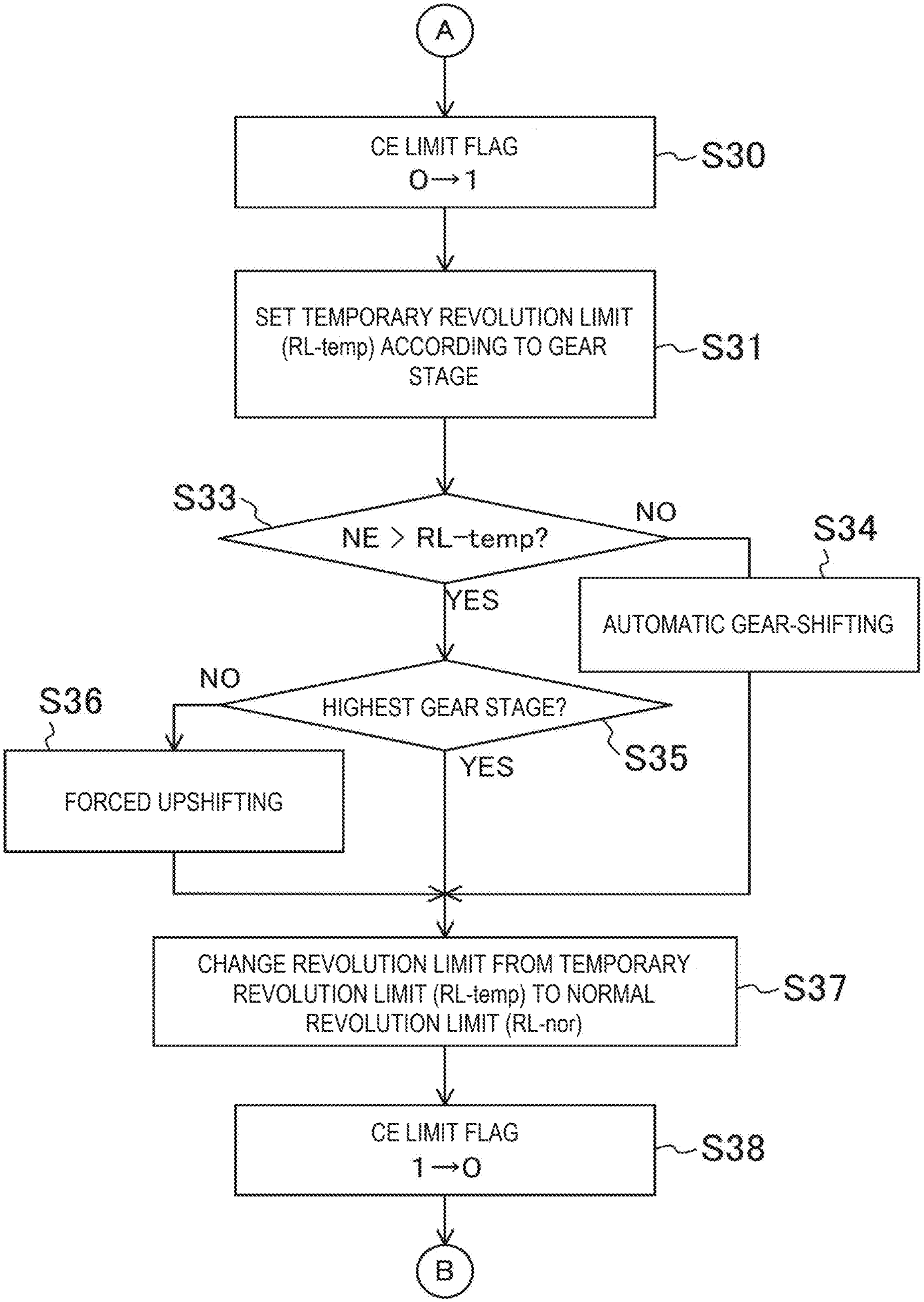
FIG. 9B shows a portion of the flowchart shown in FIG. 9A.

FIG. 7 shows a flowchart related to the entire-range stoichiometric air-fuel ratio operation control as an example. FIG. 8 shows a flowchart related to the intake air charge amount limit control as an example. FIG. 9A and FIG. 9B show flowcharts related to the forced upshift control and the revolution limit change control as an example.

As shown in FIG. 7, during the operation of the engine 2, the VCM 13 always reads detection signals that are output from various sensors (step S1). Based on these detection signals, the ECM 11 sets, in cooperation with the VCM 13, a target torque (target output) to be output in the control of the engine 2 (step S2). Based on the target output, the ECM 11 sets CE to be a target (target CE) corresponding to the stoichiometric air-fuel ratio (λ1) (step S3).

The ECM 11 sets a throttle opening degree based on the target CE (step S4). The ECM 11 sets a fuel injection amount corresponding to the stoichiometric air-fuel ratio (λ1) (step S5). The ECM 11 sets timings of fuel injection and ignition for each cylinder 20 according to the operation state of the engine 2 (step S6). The ECM 11 controls the actions of the throttle valve 42, the injection valve 25, and the spark plug 26 based on the set throttle opening degree and the set fuel injection amount, and based on the set fuel injection timing and the set ignition timing (step S7). Therefore, combustion is intermittently and repeatedly performed in the combustion chamber 23 of each cylinder 20.

Due to such a control performed by the powertrain control device 10, the engine 2 operates at the stoichiometric air-fuel ratio over the entire operation range of the engine 2. Accordingly, it is possible to purify exhaust gas always in an optimal state. Advanced emission performance can be achieved. The ECM 11 also controls the actions of the intake S-VT 30, the exhaust S-VT 31, the SCV 32, and the EGR valve 56 according to the operation state of the engine 2 in such a way that these actions are in coordination with the action of the throttle valve 42 and the like.

In contrast, when the powertrain control device 10 performs such an entire-range stoichiometric air-fuel ratio operation control, as described above, the amount of exhaust heat from the engine 2 excessively increases in the operation range with high revolution and high load. Thus, the ECM 11 sets a CE limit value corresponding to risk so as to prevent the temperature of the three-way catalyst from exceeding the allowable temperature.

To be more specific, as shown in FIG. 8, the ECM 11 obtains, in cooperation with the VCM 13, a temperature Texg of exhaust gas that flows out from the engine 2. Then, the ECM 11 determines whether the temperature of the exhaust gas is higher than a predetermined first threshold Ts1. The ECM 11 also obtains a temperature Tcat of a three-way catalyst in cooperation with the VCM 13. The ECM 11 then determines whether this temperature of the three-way catalyst is higher than a predetermined second threshold Ts2 (step S10). The first threshold and the second threshold are set in advance in the ECM 11.

When it is determined that the temperature of the exhaust gas is equal to or less than the first threshold, and it is determined that the temperature of the three-way catalyst is equal to or less than the second threshold, the ECM 11 determines that there is a low possibility of the temperature of the three-way catalyst exceeding the allowable temperature (low risk state). Therefore, the ECM 11 calculates a CE limit value (first CE limit value) by a normal simple calculation method (first calculation method) (step S11).

In contrast, when it is determined that the temperature of the exhaust gas is higher than the first threshold, or when it is determined that the temperature of the three-way catalyst is higher than the second threshold, the ECM 11 determines that the temperature of the exhaust gas or the temperature of the three-way catalyst is close to the limit, so that there is a high possibility of the temperature of the three-way catalyst exceeding the allowable temperature (high risk state). Therefore, the ECM 11 switches the calculation method to calculate a CE limit value (second CE limit value) by a temporary advanced calculation method (second calculation method) (step S12).

The first calculation method and the second calculation method differ from each other in accuracy in the estimation of the CE limit value. The second calculation method has higher estimation accuracy than the first calculation method. The second CE limit value has higher reliability as the CE limit value than the first CE limit value.

In the case of the low risk state, CE is usually deviates from the CE limit value. That is, there is almost no possibility of CE reaching the CE limit value. Accordingly, there is no problem even when estimation accuracy is not high.

In contrast, in the case of the high risk state, CE usually reaches the CE limit value and is limited (the intake air charge amount is limited). The output from the engine 2 is reduced, thus affecting the driving performance of the automobile 1. Accordingly, to suppress a reduction in the output from the engine 2, it is preferable that the CE limit value have a high reliability.

Figure 10:
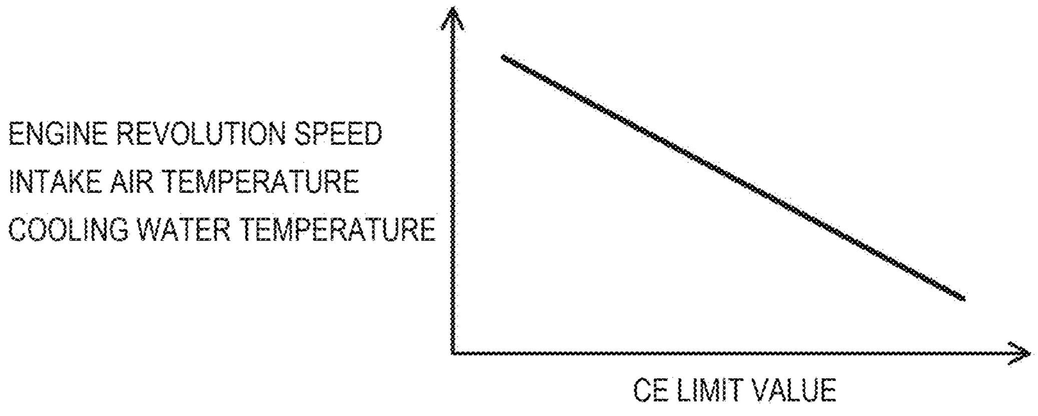
FIG. 10 is a diagram of an image showing the relationship between main state values and CE limit value.

Of various state values that are actually measured, the CE limit value has a high correlation with engine revolution speed, intake air temperature, and temperature of coolant in the engine 2. FIG. 10 shows the relationship between these state values and the CE limit value as an example.

A higher engine revolution speed causes a larger amount of exhaust heat from the engine 2 per unit time, thus increasing the temperature of the three-way catalyst. Accordingly, a smaller CE limit value (a smaller upper limit value of the intake air charge amount), that is, stricter limitation on CE, is set for a higher engine revolution speed.

The same also applies to intake air temperature and temperature of coolant in the engine 2. A smaller CE limit value is set for a higher intake air temperature. A smaller CE limit value is set for a higher temperature of coolant in the engine 2.

As described above, it is preferable that a smaller CE limit value be set for a higher value of at least any one of the revolution speed of the engine 2, intake air temperature, and the temperature of coolant in the engine 2. It is possible to achieve both suppression of thermal deterioration of the three-way catalyst and suppression of a reduction in the output from the engine 2 in a well-balanced manner.

Particularly, the temperature of the three-way catalyst depends more greatly on engine revolution speed and intake air temperature than on temperature of coolant in the engine 2. Accordingly, in the first calculation method, of these state values, the first CE limit value is calculated based on two values consisting of engine revolution speed and intake air temperature and based on a predetermined base state value.

The ECM 11 includes a base map that contains data of reference numerical values for other state values necessary for calculation of the CE (SCV opening degree, S-VT angle of intake air and exhaust gas, and the like for example). The base state value is obtained from this base map. With the first calculation method in which calculation is performed based on two main state values, it is possible to efficiently calculate the first CE limit value having required and sufficient reliability with a simple arithmetic operation.

In contrast, in the second calculation method, the CE limit value (base value) is calculated in a similar manner to the first calculation method, based on three values consisting of engine revolution speed, intake air temperature, and temperature of coolant in the engine 2 and based on the predetermined base state value obtained from the base map. With the second calculation method, the CE limit value (base value) is calculated based on all of three state values having a high correlation and hence it is possible to obtain a higher estimation accuracy.

In the second calculation method, to further increase estimation accuracy, the CE limit value (base value) is further corrected according to state values that are actually measured. Therefore, the second CE limit value having a higher reliability is calculated.

Figure 11:
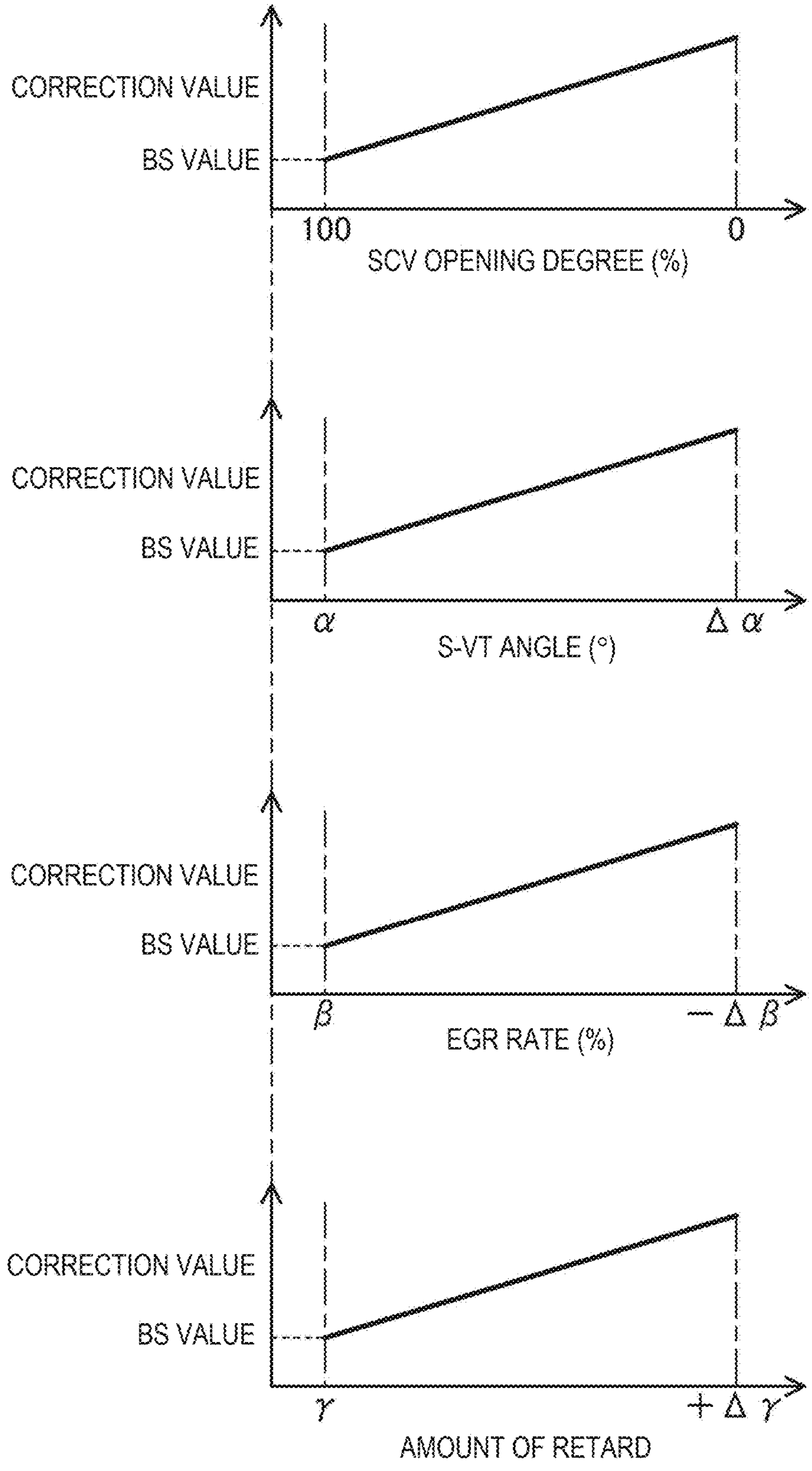
FIG. 11 is a diagram of an image showing the relationship between main state values and correction values.

In the case of this automobile 1, state values that affect the estimation accuracy include SCV opening degree, intake S-VT angle, exhaust S-VT angle, EGR rate, and amount of retard. FIG. 11 shows the relationship between these state values and correction values as an example.

In the case of SCV opening degree, for example, full open (the opening degree being 100%) is set as the base state value (BS value) for SCV opening degree. A larger amount of deviation of the opening degree of the SCV 32 relative to the base state value, that is, a smaller SCV opening degree, causes a larger deviation of intake air introduced into the combustion chambers 23 from the pairs of intake ports 2*c*, 2*c*. Such a deviation increases variation in the amount of fresh air in the combustion chambers 23, thus lowering accuracy in calculation of CE. Accordingly, a deviation from the CE limit value (base value) becomes larger.

In view of the above, a larger correction value for SCV opening degree is set for a smaller SCV opening degree. Based on this correction value, the CE limit value (base value) is corrected to a stricter value, that is, to a smaller value. Reliability of the CE limit value is increased.

In the case of respective S-VT angles of exhaust gas and intake air, a predetermined angle $\alpha$ is set as the base state value (BS value) for S-VT angles. A larger amount of deviation of opening/closing timing relative to the base state value, that is, a larger amount of deviation $\Delta\alpha$ from this angle causes a larger amount of fresh air in the combustion chambers 23. Such variation lowers the accuracy of calculation of CE, thus increasing a deviation from the CE limit value (base value).

In view of the above, a larger correction value for S-VT angle is set for a larger deviation $\Delta\alpha$ in S-VT angle. Based on this correction value, the CE limit value (base value) is corrected to a stricter value, that is, to a smaller value.

A predetermined value $\beta$ is set as the base state value (BS value) for the EGR rate. When the opening degree of the EGR valve 56 is adjusted and the EGR rate changes toward the negative side correspondingly, the amount of fresh air in the combustion chambers 23 relatively increases. Accordingly, CE becomes larger than the base state value.

Thus, a larger correction value for EGR rate is set for a larger deviation $\Delta\beta$ in EGR rate on the negative side, which is related to the amount of deviation of the opening degree of the EGR valve 56. Based on this correction value, the CE limit value (base value) is corrected to a stricter value, that is, to a smaller value.

A predetermined value $\gamma$ on the retard angle side of MBT is set as the base state value (BS value) for the amount of retard. Accordingly, when the amount of retard is increased, the temperature of exhaust gas exhausted from the engine 2 increases due to a delay in combustion timing.

Thus, a larger correction value for the amount of retard is set for a larger deviation $\Delta\gamma$ in amount of retard. Based on this correction value, the CE limit value (base value) is corrected to a stricter value, that is, to a smaller value.

As described above, with the second calculation method, it is possible to obtain a second CE limit value that takes into account the lowering of accuracy in calculation of CE and a difference between base state value and actual state value. The second calculation method can calculate CE with a high estimation accuracy, thus calculating a second CE limit value excellent in reliability. State values that are taken into account in the second calculation method for correction, base state values for the state values, management of correction values, or the like may be suitably changed according to specifications.

As shown in FIG. 8, when the high risk state is determined, the ECM 11 calculates a second CE limit value, and sends a command to change a CE limit flag (a flag change command) to the TCM 12 (step S13).

As shown in FIG. 9A, "0" is set in the TCM 12 as the initial value for the CE limit flag (step S20). The value of the CE limit flag is "0" or "1." The value "0" corresponds to the low risk state, and the value "1" corresponds to the high risk state.

The TCM 12 determines whether the flag change command has been received from the ECM 11 (step S21). When the flag change command has not been received (No in step S21), it means the low risk state and hence the TCM 12 sets the normal revolution limit (RL-nor) according to the gear stage by referencing the table of revolution limits (step S22). In the case of this automobile 1, a uniform value (NE0) is set regardless of whether the gear stage is high or low.

In the case of the low risk state, the TCM 12 determines whether the engine revolution speed (NE) is exceeds the normal revolution limit (step S23). As a result, when the engine revolution speed is equal to or less than the normal revolution limit, the TCM 12 performs automatic gear-shifting (step S24). That is, the TCM 12 shifts the gear stage of the automatic transmission 3 based on the shift map 90, as is performed in conventional technology.

In contrast, when the engine revolution speed exceeds the normal revolution limit, the TCM 12 determines whether the automatic transmission 3 is in the highest gear stage (the sixth gear stage in this automobile 1) (step S25). As a result, when the automatic transmission 3 is not in the highest gear stage, the TCM 12 forcibly shifts up the automatic transmission 3 (step S26).

The automatic transmission 3 is forcibly shifted up. Therefore, the engine revolution speed is reduced. Accordingly, it is possible to cause the engine revolution speed to be smaller than the value of the normal revolution limit. It is possible to prevent excessive revolution of the engine 2.

After the TCM 12 forcibly shifts up the automatic transmission 3, the TCM 12 returns. In contrast, when the automatic transmission 3 is in the highest gear stage, the TCM 12 cannot shift up the automatic transmission 3. Accordingly, the TCM 12 returns in this case as well. The powertrain control device 10 prevents excessive revolution of the engine 2 by means other than forced upshifting (for example, fuel cut).

When the TCM 12 receives the flag change command from the ECM 11, it means the high risk state (Yes in step S21). Accordingly, in this case, the TCM 12 changes the value of the CE limit flag from "0" to "1" (step S30) as shown in FIG. 9B.

Next, the TCM 12 sets a temporary revolution limit (RL-temp) according to the gear stage by referencing the table of revolution limits (step S31). In the case of this automobile 1, the value (NE2) for low-speed stages is set for the gear stages from the first gear stage to the third gear stage, and the value (NE3) for high-speed stages is set for the gear stages from the fourth gear stage to the sixth gear stage.

Then, the TCM 12 determines whether the engine revolution speed (NE) exceeds the temporary revolution limit (step S33). As a result, when the engine revolution speed is equal to or less than the temporary revolution limit, the TCM 12 performs automatic gear-shifting as long as the engine revolution speed does not exceed the temporary revolution limit (step S34).

When the engine revolution speed exceeds the temporary revolution limit, the TCM 12 determines whether the automatic transmission 3 is in the highest gear stage (step S35). As a result, when the automatic transmission 3 is not in the highest gear stage, the TCM 12 forcibly shifts up the automatic transmission 3 (step S36).

The automatic transmission 3 is forcibly shifted up. Therefore, the engine revolution speed is reduced. Due to a reduction in engine revolution speed, the CE limit value is relaxed, thus being increased. Therefore, power from the engine 2 can be obtained, thus increasing the engine revolution speed and the vehicle speed.

Then, the TCM 12 changes the revolution limit from the temporary revolution limit to the normal revolution limit (step S37). The TCM 12 returns the value of the CE limit flag to the initial value again (step S38). Thereafter, the TCM 12 returns.

Accordingly, this powertrain control device 10 performs the intake air charge amount limit control and hence it is possible to perform the entire-range stoichiometric air-fuel ratio operation with the three-way catalyst held at a proper temperature. Further, even when the intake air charge limit control is performed, it is possible to ensure power from the engine 2 by combination of the forced upshift control and the revolution limit change control. It is also possible to suppress the lowering of the driving performance of the vehicle caused by an insufficient output from the engine 2.

Therefore, it is possible to achieve advanced emission performance in an engine vehicle without impairing the driving performance.

<Modification>

When the above-described control is performed, there may be cases in which the driver perceives that an engine sound is noisy during acceleration in the case in which the automobile 1 is accelerated with the engine 2 operating at high revolutions and high load.

That is, when the forced upshifting is performed in the revolution limit change control, the power itself of the engine 2 is limited as described above, and hence an increase in vehicle speed, that is, acceleration, inevitably becomes gradual. For this reason, there can be cases in which sufficient acceleration cannot be obtained despite a loud engine sound even when the accelerator is fully opened with the engine 2 operating at high revolutions, such as when traveling along a long climbing lane at a high speed.

Figure 12:
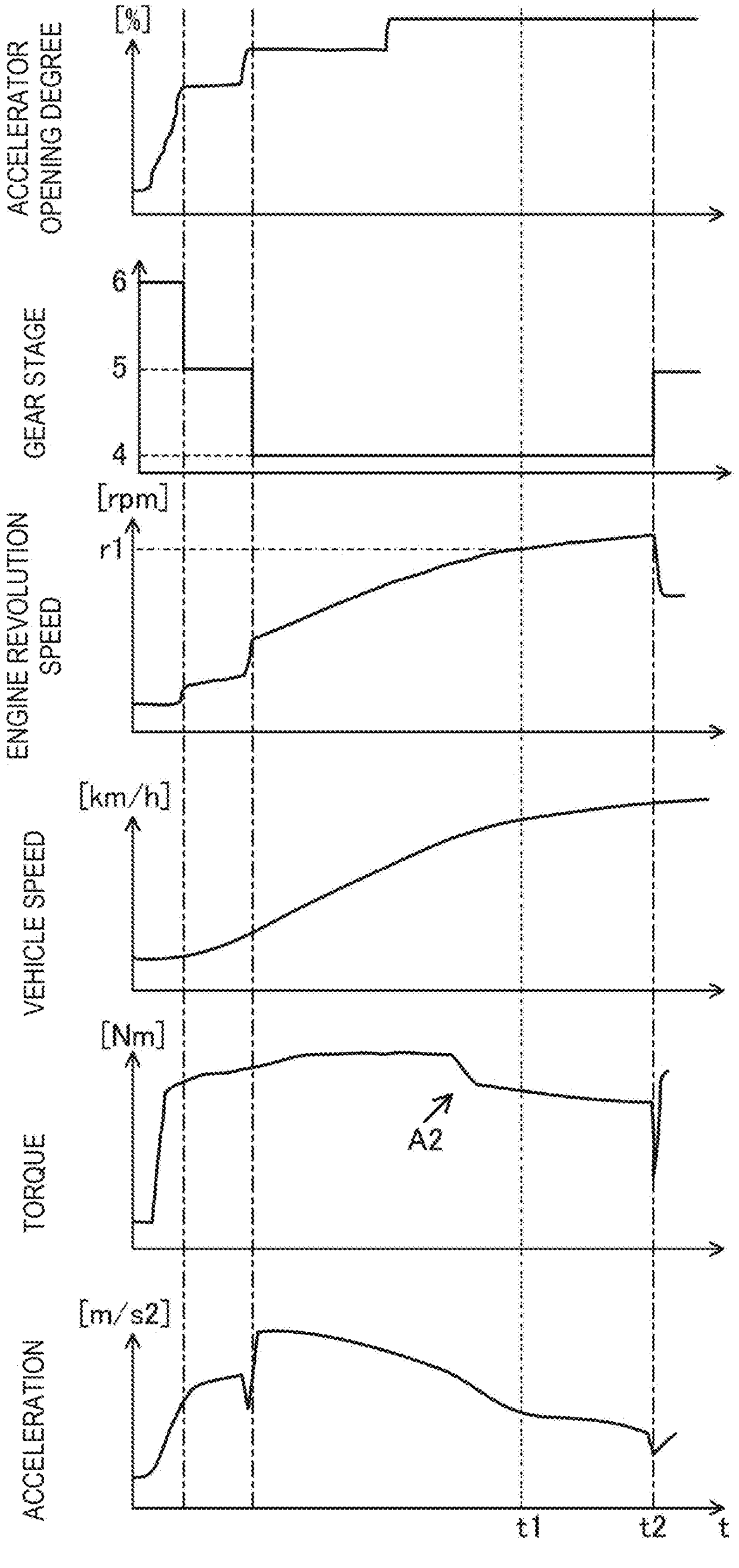
FIG. 12 is a diagram for illustrating a problem to be solved by a modification.

FIG. 12 shows, in a simplified manner, examples of operation data during test traveling of an automobile to which the disclosed technology is applied (hereinafter referred to as "test vehicle"). The operation data shown are data obtained when the accelerator was depressed into a fully open state to accelerate while the test vehicle was traveling along a long climbing lane at a high speed (140 km/h, for example).

In the case of this test vehicle, the gear stage when the accelerator is fully opened in this operation state is the fourth gear stage and, according to an increase in accelerator opening degree, the gear stage of the automatic transmission 3 is shifted down to accelerate. The gear stage is shifted to the sixth gear stage, the fifth gear stage, and the fourth gear stage.

The engine revolution speed and the vehicle speed gradually increase with an increase in accelerator opening degree. When the engine revolution speed increases, the engine sound increases. The forced upshifting is performed by the revolution limit change control at time t2, so that the automatic transmission 3 is shifted from the fourth gear stage to the fifth gear stage.

During the acceleration in the fourth gear stage, the torque (load) of the engine 2 decreases as shown by an arrow A2 due to the limitation of CE. In response to it, at a later stage of the fourth gear stage, an increase in engine revolution speed becomes gradual and the acceleration of the test vehicle becomes small, so that an increase in vehicle speed will also be gradual (engine revolution speed r1, after the timing of time t1).

In such a case, although the engine sound is loud and noisy, expected acceleration cannot be obtained and there is a possibility of the driver feeling sluggish acceleration. In view of the above, the present modification (second powertrain control device 10) is devised such that engine sound can be suppressed even in such a case to prevent the driver from feeling sluggish acceleration.

(Configuration of Second Powertrain Control Device)

The basic configuration of a second powertrain control device 10 is substantially the same as that of the above-described powertrain control device 10 (referred to as "first powertrain control device 10" in the present embodiment). For example, the second powertrain control device 10 is also constituted of the ECM 11, the TCM 12, the VCM 13 and the like as with the first powertrain control device 10, and has a similar basic configuration.

Accordingly, the same components are given the same reference characters and the description of such components is simplified or omitted. Different components will be described in detail.

The second powertrain control device 10 is configured such that, in the case in which the TCM 12 performs the revolution limit change control, when the acceleration of the automobile 1 is equal to or less than an acceleration feeling recognition boundary value set in advance, control of forcibly shifting up the automatic transmission 3 is performed at a point in time when the engine revolution speed has reached a predetermined engine revolution speed that is lower than a temporary revolution limit set by the revolution limit change control (early forced upshift control).

Figure 13:
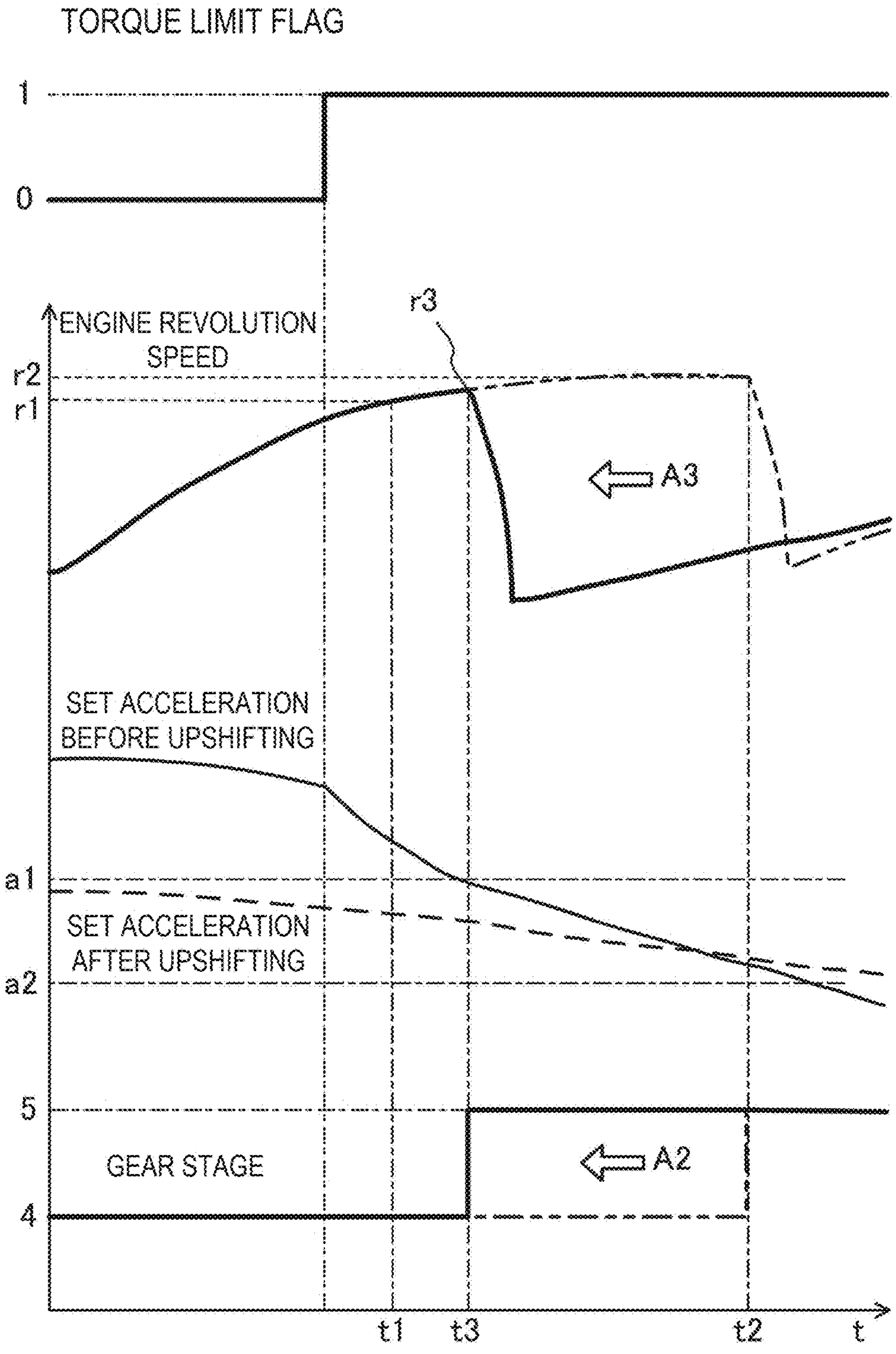
FIG. 13 shows time charts related to an early forced upshift control.

FIG. 13 shows time charts for the early forced upshift control as an example. The time charts shown in the example correspond to the above-described operation data for the test vehicle. That is, the above-described data are again used in this time chart as a comparison example, which does not include the devising of the powertrain control device. Two-dot chain lines correspond to the above-described operation data of the test vehicle. Solid lines correspond to the early forced upshift control of the present modification.

As described above, in the comparison example, the driver starts to feel sluggish acceleration at the engine revolution speed r1 and at time t1. At time t2, the forced upshifting is performed at a temporary revolution limit r2 by the revolution limit change control, and the automatic transmission 3 is shifted from the fourth gear stage to the fifth gear stage.

In the second powertrain control device 10, as shown by the arrow A2 in FIG. 13, upshifting is forcibly performed by the early forced upshift control (from the fourth gear stage to the fifth gear stage) at a point in time when the engine revolution speed has reached a predetermined engine revolution speed r3, which is lower than the temporary revolution limit r2. Therefore, as shown by an arrow A3 in FIG. 13, the engine revolution speed is reduced at an early timing. In response to it, the engine sound decreases. Accordingly, the driver is less likely to feel that the engine sound is noisy.

However, given that the driver obtains the feeling of acceleration, there is no possibility of the driver feeling sluggish acceleration even if the engine sound is noisy. Accordingly, it is preferable to perform upshifting at a timing at which the driver no longer obtains the feeling of acceleration. To that end, the second powertrain control device 10 sets a boundary value (acceleration feeling recognition boundary value: a1) of the range of the acceleration in which the driver can recognize the feeling of acceleration, according to the operation state of the automobile. The acceleration feeling recognition boundary value a1 can be set in advance by performing tests, simulations, or the like.

When the acceleration of the automobile is higher than the acceleration feeling recognition boundary value, the driver can feel acceleration. However, when the acceleration of the automobile is lower than the acceleration feeling recognition boundary value, the driver does not feel acceleration. In FIG. 13, the forced upshifting is performed at a point in time when the acceleration of the automobile reaches the acceleration feeling recognition boundary value (time t3). Accordingly, it is possible to effectively prevent the driver from feeling sluggish acceleration.

However, when the automatic transmission 3 is shifted up, the gear ratio is reduced and the acceleration changes in the direction of reduction. Thus, even when the forced upshifting is performed at an early stage and the engine sound decreases, if deceleration occurs after the upshifting, the driver may feel discomfort. Accordingly, it is preferable to maintain the acceleration state even after the upshifting is performed.

Thus, the second powertrain control device 10 is configured such that the early forced upshift control is performed only when the acceleration of the automobile after the upshifting is predicted to be equal to or greater than a deceleration feeling recognition boundary value set in advance.

To be more specific, a boundary value (deceleration feeling recognition boundary value: a2) of the range of the acceleration in which the driver can recognize the feeling of deceleration is set in the second powertrain control device 10 according to the operation state of the automobile. Although the deceleration feeling recognition boundary value a2 is inherently “0 (zero),” the deceleration feeling recognition boundary value a2 is set to a positive value (0.05 m/s2, for example) including an error in practical use. The deceleration feeling recognition boundary value a2 can also be set in advance by performing tests, simulations, and the like.

In FIG. 13, the set acceleration before the upshifting (the acceleration in the fourth gear stage) is shown by a solid line, and the set acceleration after the upshifting (the acceleration in the fifth gear stage) is shown by a broken line. The acceleration after the upshifting has a smaller reduction ratio (a more gradual inclination) than the acceleration before the upshifting. Therefore, the magnitude relation between the acceleration after the upshifting and the acceleration before the upshifting switches in the vicinity of time t2, allowing the vehicle speed to be increased by the forced upshift control.

At time t3 at which the early forced upshift control is performed, the acceleration after the upshifting is sufficiently higher than the deceleration feeling recognition boundary value a2. Accordingly, it is possible to maintain the acceleration state even after the upshifting is performed. There is no possibility of the driver feeling sluggish acceleration.

The early forced upshift control is performed only when an engine revolution speed is at a predetermined high revolution in a specific gear stage of the automatic transmission 3.

That is, as described above, the early forced upshift control is effective in a specific gear stage and engine revolution speed at which the driver feels sluggish acceleration for a loud engine sound due to the execution of the forced upshift control. Conditions for the effective control vary depending on specifications of the automobile.

In the automobile shown as the example, the engine revolution speed r3 in the fourth gear stage corresponds to the condition as described above. However, there may be cases in which predetermined engine revolution speeds such as the third gear stage, the fifth gear stage, or either of the third gear stage or the fourth gear stage correspond to the condition. However, this engine revolution speed is at a high revolution of a predetermined value or greater (4,000 rpm or greater, for example).

Although it is preferable to perform the early forced upshifting when the acceleration of the vehicle is equal to or less than the acceleration feeling recognition boundary value a1, the early forced upshifting may be performed at a timing at which the acceleration of the vehicle is greater than the acceleration feeling recognition boundary value a1. For example, the early forced upshift control may be performed at a timing at which the engine revolution speed becomes r1 or immediately after the engine revolution speed becomes r1.

(Specific Example of Second Powertrain Control Device)

FIG. 14 shows an example of a table of revolution limits set in the second powertrain control device 10. Also in the second powertrain control device 10, a normal revolution limit (RL-nor) is set as in the first powertrain control device 10.

In the first powertrain control device 10, the temporary revolution limits (RL-temp) constituted of two revolution speeds, that is, the revolution speed for the low-speed stages and the revolution speed for the high-speed stages, are set. By contrast, in the second powertrain control device 10, temporary second revolution limits (RL-temp2) used in the early forced upshift control are set in addition to temporary first revolution limits (RL-temp1) that correspond to the temporary revolution limits (RL-temp).

In the table shown as the example, temporary first revolution limits (RL-temp1) as different revolution speeds are set for respective gear stages (NE11 to NE16). As with the above-described temporary revolution limits (RL-temp), the first revolution speed (NE0) as the normal revolution limit (RL-nor) is sufficiently higher than the respective engine revolution speeds, which are the temporary first revolution limits (RL-temp1) (NE0>>NE1*).

As with the above-described temporary revolution limits (RL-temp), adjacent gear stages have the same amount of decrease in temporary first revolution limit from the normal revolution limit, or an amount of decrease in temporary first revolution limit for the high gear stages from the normal revolution limit is greater than an amount of decrease in temporary revolution limit for the low gear stages from the normal revolution limit. That is, the magnitude relation between these revolution speeds for the temporary first revolution limits (RL-temp1) is NE11≥NE12≥NE13≥NE14≥NE15≥NE16.

This table of revolution limits also corresponds to the above-described operation data. That is, the temporary second revolution limit (RL-temp2) is set for the fourth gear stage of the automatic transmission 3. An engine revolution speed NE24 as the temporary second revolution limit (RL-temp2) is smaller than a corresponding engine revolution speed NE14 as the temporary first revolution limit (RL-temp1) for the fourth gear stage (NE14>NE24).

In the present embodiment, the case of setting the temporary second revolution limit (RL-temp2) only for the fourth gear stage is described as an example. However, as described above, the temporary second revolution limit (RL-temp2) may be set for the third gear stage depending on specifications of the automobile (NE23).

(Specific Example of Control of Second Powertrain Control Device)

The basic configuration of control related to the forced upshift control and the revolution limit change control for the second powertrain control device 10 is also similar to that of the first powertrain control device 10, except for the early forced upshift control.

That is, a flowchart for the second powertrain control device 10 is the same as FIG. 9A in the portion corresponding to the that shown in FIG. 9A. The flowchart for the second powertrain control device 10 partially differs from the flowchart shown in FIG. 9B. Accordingly, the same reference characters are directly used for the steps with the same actions, and the description of such actions is simplified or omitted.

Figure 15:
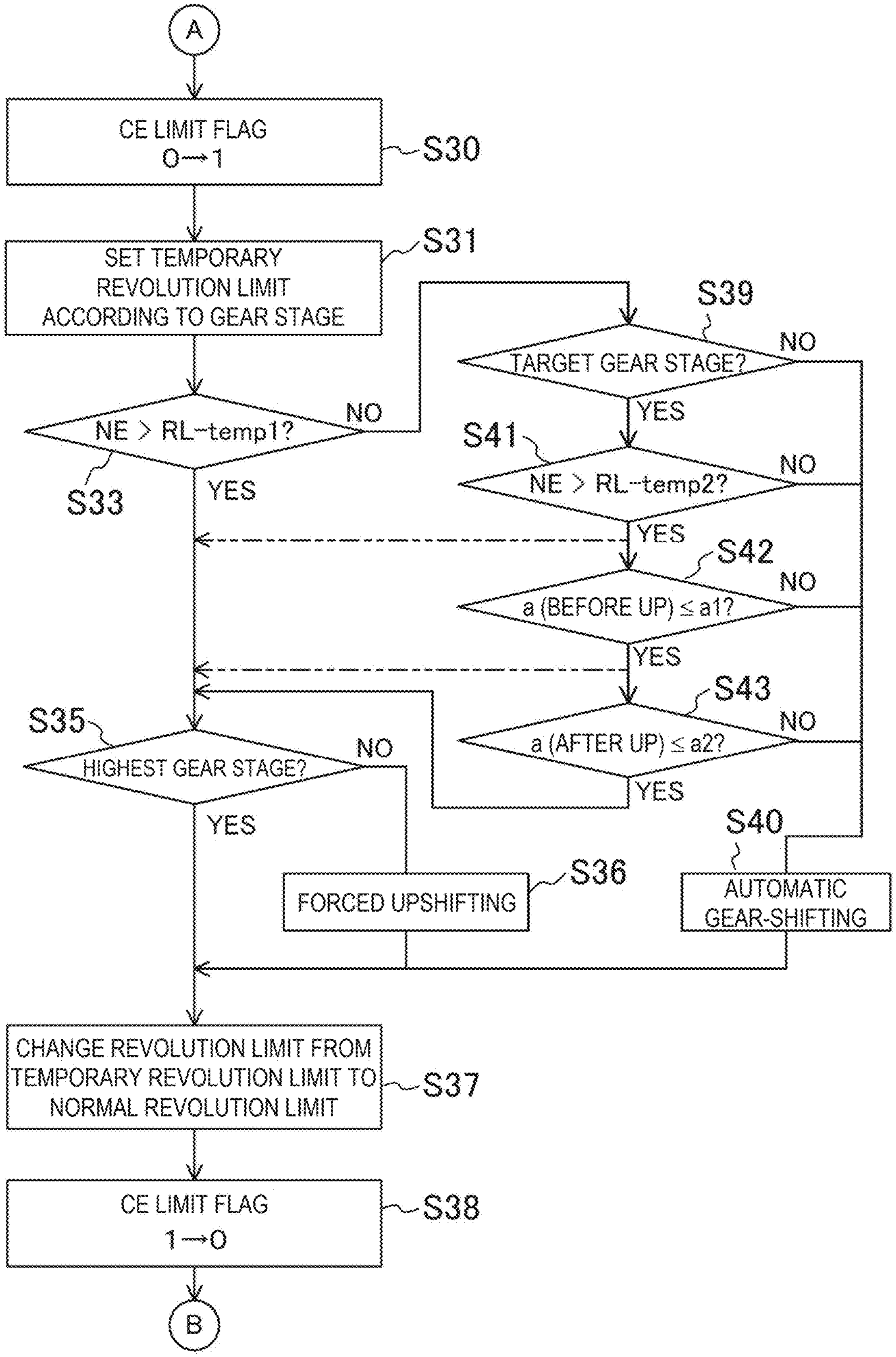
FIG. 15 is an example of (a portion of) a flowchart for the early forced upshift control.

In the flowchart for the second powertrain control device 10 as well, when the TCM 12 receives a flag change command from the ECM 11, the TCM 12 changes the value of the CE limit flag from "0" to "1" (step S30) as shown in FIG. 15.

Next, the TCM 12 sets temporary revolution limits (RL-temp1 and RL-temp2) according to the gear stages by referencing the table of revolution limits (see FIG. 14) (step S31). In the case of the second powertrain control device 10, values (NE11 to NE16) for engine revolution speeds corresponding to the respective gear stages from the first gear stage to the sixth gear stage are set as the temporary first revolution limits (RL-temp1). A value (NE24) for an engine revolution speed corresponding to the fourth gear stage is set as the temporary second revolution limit (RL-temp2).

Then, the TCM 12 determines whether the engine revolution speed (NE) is greater than the temporary first revolution limit (RL-temp1) (step S33). As a result, when the engine revolution speed is greater than the temporary first revolution limit (Yes in step S33), the TCM 12 determines whether the automatic transmission 3 is in the highest gear stage (step S35). As a result, when the automatic transmission 3 is not in the highest gear stage, the TCM 12 forcibly shifts up the automatic transmission 3 (step S36).

The automatic transmission 3 is forcibly shifted up. Therefore, the engine revolution speed reduces. Due to the reduction in engine revolution speed, the CE limit value is relaxed, thus being increased. Therefore, power from the engine 2 can be obtained, thus increasing the engine revolution speed and the vehicle speed.

Then, the TCM 12 changes the revolution limit from the temporary first revolution limit to the normal revolution limit (step S37). The TCM 12 returns the value of the CE limit flag to the initial value again (step S38). Thereafter, the TCM 12 returns.

In contrast, when the engine revolution speed is equal to or less than the temporary first revolution limit (No in step S33), the TCM 12 determines whether the gear stage of the automatic transmission 3 is a gear stage that is subjected to the early forced upshift control (step S39). To be more specific, the TCM 12 determines whether the gear stage of the automatic transmission 3 is the fourth gear stage.

As a result, when the gear stage of the automatic transmission 3 is not the fourth gear stage (No in step S39), the TCM 12 maintains the automatic gear-shifting (step S40). The TCM 12 then changes the revolution limit from the temporary first revolution limit to the normal revolution limit (step S37), returns the value of the CE limit flag to the initial value (step S38), and then returns.

In contrast, when the TCM 12 determines that the gear stage of the automatic transmission 3 is the fourth gear stage (Yes in step S39), the TCM 12 determines whether the engine revolution speed (NE) is greater than the temporary second revolution limit (RL-temp2) (step S41). As a result, when the engine revolution speed (NE) is greater than the temporary second revolution limit (RL-temp2) (Yes in step S41), the TCM 12 may immediately perform the early forced upshift control as shown by a two-dot chain line.

However, in the case of this second powertrain control device 10, attaching importance to driving performance, the TCM 12 compares the acceleration of the automobile 1 with the acceleration feeling recognition boundary value a1 (step S42). As a result, when the acceleration of the automobile 1 is greater than the acceleration feeling recognition boundary value a1 (No in step S42), the feeling of acceleration can be obtained and hence the TCM 12 advances to step S40, where the automatic gear-shifting is maintained.

In contrast, when the acceleration of the automobile 1 is equal to or less than the acceleration feeling recognition boundary value a1 (Yes in step S42), the TCM 12 may immediately perform the early forced upshift control as shown by a two-dot chain line. However, in the case of this second powertrain control device 10, for attaching importance to driving performance, it is predicted whether the acceleration of the automobile after the upshifting becomes equal to or greater than the deceleration feeling recognition boundary value a2 (step S43).

As a result, when it is predicted that the acceleration of the automobile 1 after the upshifting does not become equal to or greater than the deceleration feeling recognition boundary value a2 (No in step S43), the feeling of acceleration cannot be obtained even if the upshifting is performed and hence the TCM 12 advances to step S40, where the automatic gear-shifting is maintained.

In contrast, when it is predicted that the acceleration of the automobile 1 after the upshifting becomes equal to or greater than the deceleration feeling recognition boundary value a2 (Yes in step S43), the feeling of acceleration can be obtained even when the upshifting is performed and hence the early forced upshift control is performed. That is, when the gear stage is not the highest gear stage, the TCM 12 performs the forced upshifting at an early timing at which the engine revolution speed is lower than the temporary first revolution limit (step S36).

Therefore, the engine revolution speed is reduced at an early timing as shown in FIG. 13. In response, the engine sound decreases and the engine sound can be suppressed. The acceleration of the automobile 1 can also be maintained within a range in which the driver can obtain the feeling of acceleration. Accordingly, there is no possibility of the driver feeling sluggish acceleration.

The disclosed technology is not limited to the above-described embodiment and also includes various other configurations. For example, although the vehicle that is driven only by the engine 2 is described as an example in the embodiment, the vehicle may be a hybrid vehicle that also uses a motor in combination. There may be a situation in which a motor cannot be used in a hybrid vehicle.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims. Further, if used herein, a phrase of the form "at least one of A and B" means at least one A or at least one B, without being mutually exclusive of each other, and does not require at least one A and at least one B. If used herein, the phrase "and/or" means either or both of two stated possibilities.

REFERENCE CHARACTER LIST

1 automobile (vehicle)
2 engine
3 automatic transmission
10 powertrain control device
11 engine control module (ECM)
12 transmission control module (TCM)
13 vehicle control module (VCM)
20 cylinder
21 crankshaft
22 piston
23 combustion chamber
25 injection valve
26 spark plug
27 intake valve
28 exhaust valve
30 intake S-VT
31 exhaust S-VT
32 swirl control valve (SCV)
33 coolant passage
40 intake passage
42 throttle valve
50 exhaust passage
51 muffler
52 exhaust gas purification apparatus
55 exhaust gas recirculation (EGR) passage
56 EGR valve
62 torque converter
63 transmission mechanism
63*a* planetary gear mechanism
63*b* clutch
70 accelerator opening degree sensor
71 vehicle speed sensor
72 engine revolution speed sensor
73 crank angle sensor
75 airflow sensor
76 coolant temperature sensor
77 intake air temperature sensor
78 exhaust gas temperature sensor
80 SCV opening degree sensor
81 EGR valve opening degree sensor
82 catalyst temperature sensor
90 shift map

The invention claimed is:

1. A powertrain control device for a vehicle including an engine that operates by combustion of gasoline, an exhaust gas purification apparatus that purifies, using a three-way catalyst, exhaust gas exhausted from the engine, and an automatic transmission that automatically changes an output from the engine, the vehicle traveling by controlling the engine and the automatic transmission, the powertrain control device comprising:

an engine control module that performs entire-range stoichiometric air-fuel ratio operation control to control operation of the engine such that a stoichiometric air-fuel ratio is achieved over an entire operation range, and when an intake air charge amount reaches an upper limit value that is set to prevent a temperature of the three-way catalyst from exceeding an allowable temperature, performs intake air charge amount limit control to limit the intake air charge amount; and a transmission control module that performs automatic shift control to control an action of the automatic transmission based on a shift map which is set based on an accelerator opening degree and a vehicle speed, and when an engine revolution speed reaches a revolution limit that is set to prevent revolution of the engine from exceeding an allowable limit, performs forced upshift control to forcibly shift up the automatic transmission, wherein when the engine control module limits the intake air charge amount, the transmission control module performs revolution limit change control of lowering the revolution limit, and wherein different amounts of decrease in the revolution limit in the revolution limit change control are set for a high gear stage and a low gear stage of the automatic transmission, and an amount of decrease for the high gear stage is greater than an amount of decrease for the low gear stage.

2. The powertrain control device according to claim 1, wherein a smaller upper limit value of the intake air charge amount is set for a larger value of at least any one of the engine revolution speed, an intake air temperature, and a temperature of coolant in the engine.

3. The powertrain control device according to claim 2, wherein when it is determined by the engine control module that there is a high possibility of the temperature of the three-way catalyst exceeding the allowable temperature, the upper limit value of the intake air charge amount is calculated based on three values consisting of the engine revolution speed, the intake air temperature, and the temperature of coolant in the engine, and based on a predetermined base state value.

4. The powertrain control device according to claim 3, wherein when it is determined by the engine control module that there is a low possibility of the temperature of the three-way catalyst exceeding the allowable temperature, the upper limit value of the intake air charge amount is calculated based on two values consisting of the engine revolution speed and the intake air temperature, and based on the predetermined base state value.

5. The powertrain control device according to claim 3, wherein the engine includes a swirl control valve that changes a strength of a swirl flow generated in a combustion chamber by adjusting an opening degree of the swirl control valve, and the upper limit value of the intake air charge amount is corrected based on an amount of deviation of the opening degree of the swirl control valve relative to the base state value.

6. The powertrain control device according to claim 3, wherein the engine includes a variable valve timing mechanism that enables adjustment of an opening/closing timing of an intake valve and/or an exhaust valve, and the upper limit value of the intake air charge amount is corrected based on an amount of deviation of the opening/closing timing of the intake valve and/or the exhaust valve relative to the base state value.

7. The powertrain control device according to claim 3, wherein the engine includes an exhaust gas recirculation (EGR) valve that changes, by adjusting an opening degree of the EGR valve, an amount of exhaust gas to be recirculated, and the upper limit value of the intake air charge amount is corrected based on an amount of deviation of the opening degree of the EGR valve relative to the base state value.

8. The powertrain control device according to claim 3, wherein the engine control module further performs ignition retard control of performing control in such a way as to cause a delay in ignition timing in order to suppress knocking, and the upper limit value of the intake air charge amount is corrected based on an amount of retard of the ignition timing relative to the base state value.

9. The powertrain control device according to claim 1, wherein in a case in which the transmission control module performs the revolution limit change control, when an acceleration of the vehicle is equal to or less than an acceleration feeling recognition boundary value set in advance, early forced upshift control of forcibly shifting up the automatic transmission is performed at a point in time when an engine revolution speed has reached a predetermined engine revolution speed that is lower than a temporary revolution limit set by the revolution limit change control.

10. The powertrain control device according to claim 9, wherein the early forced upshift control is performed only in a case in which the acceleration of the vehicle after upshifting is predicted to be equal to or greater than a deceleration feeling recognition boundary value.

11. The powertrain control device according to claim 10, wherein the early forced upshift control is performed only in a case in which the engine revolution speed is at a predetermined high revolution in a specific gear stage of the automatic transmission.

12. The powertrain control device according to claim 9, wherein the early forced upshift control is performed only in a case in which the engine revolution speed is at a predetermined high revolution in a specific gear stage of the automatic transmission.

13. A powertrain control device for a vehicle including an engine that operates by combustion of gasoline, an exhaust gas purification apparatus that purifies, using a three-way catalyst, exhaust gas exhausted from the engine, and an automatic transmission that automatically changes an output from the engine, the vehicle traveling by controlling the engine and the automatic transmission, the powertrain control device comprising:

an engine control module that performs entire-range stoichiometric air-fuel ratio operation control to control operation of the engine such that a stoichiometric air-fuel ratio is achieved over an entire operation range, and when an intake air charge amount reaches an upper limit value that is set to prevent a temperature of the three-way catalyst from exceeding an allowable temperature, performs intake air charge amount limit control to limit the intake air charge amount; and a transmission control module that performs automatic shift control to control an action of the automatic transmission based on a shift map which is set based on an accelerator opening degree and a vehicle speed, and when an engine revolution speed reaches a revolution limit that is set to prevent revolution of the engine from exceeding an allowable limit, performs forced upshift control to forcibly shift up the automatic transmission, wherein when the engine control module limits the intake air charge amount, the transmission control module performs revolution limit change control of lowering the revolution limit, and wherein a smaller upper limit value of the intake air charge amount is set for a larger value of at least any one of the engine revolution speed, an intake air temperature, and a temperature of coolant in the engine.

14. The powertrain control device according to claim 13, wherein when it is determined by the engine control module that there is a high possibility of the temperature of the three-way catalyst exceeding the allowable temperature, the upper limit value of the intake air charge amount is calculated based on three values consisting of the engine revolution speed, the intake air temperature, and the temperature of coolant in the engine, and based on a predetermined base state value.

15. The powertrain control device according to claim 14, wherein when it is determined by the engine control module that there is a low possibility of the temperature of the three-way catalyst exceeding the allowable temperature, the upper limit value of the intake air charge amount is calculated based on two values consisting of the engine revolution speed and the intake air temperature, and based on the predetermined base state value.

16. The powertrain control device according to claim 14, wherein the engine includes a swirl control valve that changes a strength of a swirl flow generated in a combustion chamber by adjusting an opening degree of the swirl control valve, and the upper limit value of the intake air charge amount is corrected based on an amount of deviation of the opening degree of the swirl control valve relative to the base state value.

17. The powertrain control device according to claim 14, wherein the engine includes a variable valve timing mechanism that enables adjustment of an opening/closing timing of an intake valve and/or an exhaust valve, and the upper limit value of the intake air charge amount is corrected based on an amount of deviation of the opening/closing timing of the intake valve and/or the exhaust valve relative to the base state value.

18. The powertrain control device according to claim 14, wherein the engine includes an exhaust gas recirculation (EGR) valve that changes, by adjusting an opening degree of the EGR valve, an amount of exhaust gas to be recirculated, and the upper limit value of the intake air charge amount is corrected based on an amount of deviation of the opening degree of the EGR valve relative to the base state value.

19. The powertrain control device according to claim 14, wherein the engine control module further performs ignition retard control of performing control in such a way as to cause a delay in ignition timing in order to suppress knocking, and the upper limit value of the intake air charge amount is corrected based on an amount of retard of the ignition timing relative to the base state value.

20. A powertrain control device for a vehicle including an engine that operates by combustion of gasoline, an exhaust gas purification apparatus that purifies, using a three-way catalyst, exhaust gas exhausted from the engine, and an automatic transmission that automatically changes an output from the engine, the vehicle traveling by controlling the engine and the automatic transmission, the powertrain control device comprising:

an engine control module that performs entire-range stoichiometric air-fuel ratio operation control to control operation of the engine such that a stoichiometric air-fuel ratio is achieved over an entire operation range, and when an intake air charge amount reaches an upper limit value that is set to prevent a temperature of the three-way catalyst from exceeding an allowable temperature, performs intake air charge amount limit control to limit the intake air charge amount; and a transmission control module that performs automatic shift control to control an action of the automatic transmission based on a shift map which is set based on an accelerator opening degree and a vehicle speed, and when an engine revolution speed reaches a revolution limit that is set to prevent revolution of the engine from exceeding an allowable limit, performs forced upshift control to forcibly shift up the automatic transmission, wherein when the engine control module limits the intake air charge amount, the transmission control module performs revolution limit change control of lowering the revolution limit, and wherein in a case in which the transmission control module performs the revolution limit change control, when an acceleration of the vehicle is equal to or less than an acceleration feeling recognition boundary value set in advance, early forced upshift control of forcibly shifting up the automatic transmission is performed at a point in time when the engine revolution speed has reached a predetermined engine revolution speed that is lower than a temporary revolution limit set by the revolution limit change control.

* * * * *